United States Patent
Rune

(10) Patent No.: US 11,696,254 B2
(45) Date of Patent: Jul. 4, 2023

(54) MULTIPLEXING PDCCH PAGING OCCASION AND SS BURST

(71) Applicant: Telefonaktiebolaget LM Ericsson (PUBL), Stockholm (SE)

(72) Inventor: Johan Rune, Lidingö (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 18 days.

(21) Appl. No.: 17/262,805

(22) PCT Filed: Aug. 9, 2019

(86) PCT No.: PCT/SE2019/050733
§ 371 (c)(1),
(2) Date: Jan. 25, 2021

(87) PCT Pub. No.: WO2020/032867
PCT Pub. Date: Feb. 13, 2020

(65) Prior Publication Data
US 2021/0314910 A1      Oct. 7, 2021

Related U.S. Application Data

(60) Provisional application No. 62/716,685, filed on Aug. 9, 2018.

(51) Int. Cl.
*H04W 68/00* (2009.01)
*H04L 27/26* (2006.01)
*H04W 56/00* (2009.01)

(52) U.S. Cl.
CPC ....... *H04W 68/005* (2013.01); *H04L 27/2607* (2013.01); *H04W 56/001* (2013.01)

(58) Field of Classification Search
CPC ............. H04W 68/005; H04W 56/001; H04W 68/025; H04L 27/2607; H04L 5/0048; H04L 5/0053; H04L 5/0094
See application file for complete search history.

(56) References Cited

U.S. PATENT DOCUMENTS

2018/0331875 A1* 11/2018 Abedini ................ H04W 8/245
2020/0275405 A1*  8/2020 Zhang ................ H04W 68/005
(Continued)

FOREIGN PATENT DOCUMENTS

WO     2018 127025 A1     7/2018
WO     2019 243450 A1    12/2019

OTHER PUBLICATIONS

3GPP TSG-RAN2 102; Busan, South Korea; Source: Samsung; Title: Reference Frame & PO Determination: Non Default Association (R2-1807689)—May 21-25, 2018.
(Continued)

*Primary Examiner* — Sharmin Chowdhury
(74) *Attorney, Agent, or Firm* — Baker Botts L.L.P.

(57) ABSTRACT

According to some embodiments, a method performed by a wireless device for receiving paging occasions and synchronization signals in a carrier frequency band comprises obtaining a first paging occasion configuration and a first synchronization signal configuration and determining that a paging occasion specified by the first paging occasion configuration at least partially overlaps in time with a synchronization signal specified by the first synchronization signal configuration. The method further comprises modifying at least one of the paging occasion configuration for the overlapping paging occasion and the synchronization signal configuration for the overlapping synchronization signal to frequency multiplex the paging occasion and the synchronization signal. The method further comprises receiving the paging occasion and the synchronization signal according to the at least one of the modified paging occasion configuration and modified synchronization signal configuration.

22 Claims, 13 Drawing Sheets

(56) References Cited

U.S. PATENT DOCUMENTS

2020/0280957 A1* 9/2020 Gao ..................... H04W 68/02
2021/0127355 A1* 4/2021 Gonzalez ............. H04W 68/02

OTHER PUBLICATIONS

Extended European Search Report issued for Application No./Patent No. 19847646.7-1205 / 3834526 PCT/SE2019050733—Aug. 9, 2021.
3GPP TSG-RAN WG2 NR AH#3; Vancouver, Canada; Source: Ericsson; Title: Configuration of paging transmissions in multi-beam operation (Tdoc R2-1800362)—Jan. 22-26, 2018.
3GPP TS 38.213 v15.2.0; Technical Specification; 3rd Generation Partnership Project; Technical Specification Group Radio Access Network; NR; Physical layer procedures for control (Release 15)—Jun. 2018.
3GPP TS 38.331 v15.2.1; Technical Specification; 3rd Generation Partnership Project; Technical Specification Group Radio Access Network; NR; Radio Resource Control (RRC) protocol specification (Release 15)—Jun. 2018.
3GPP TSG-RAN WG2 #102; Busan, South Korea; Source: Ericsson; Title: Calculation of Paging Occasions (Tdoc R2-1806805)—May 21-25, 2018.
3GPP TSG-RAN WG2 #102; Busan, Republic of Korea; Title: [Draft] LS on timing requirements on paging occasions relative SS Blocks; Source: Ericsson [to be RAN WG2] (Tdoc R2-1806808 (Resubmission of R2-1804736))—May 21-25, 2018.
3GPP TSG-RAN WG2 Meeting #102; Busan, Korea; Source: RAN2 Chairman (Intel); Title: Proposed Agenda (R2-1806600)—May 21-25, 2018.
3GPP TSG-RAN WG2 AH 1807; Montreal, Canada; Source: Ericsson; Title: Configuration of POs within a PF (Tdoc R2-1809723)—Jul. 2-6, 2018.
PCT International Search Report issued for International application No. PCT/SE2019/050733—dated Nov. 7, 2019.
PCT Written Opinion of the International Searching Authority issued for International application No. PCT/SE2019/050733—dated Nov. 7, 2019.

* cited by examiner

| Signals | SCS | T/F Res. | OFDM Symbols | | | | | | | | | | | | | | |
|---|---|---|---|---|---|---|---|---|---|---|---|---|---|---|---|---|---|
| | | | 0 | 1 | 2 | 3 | 4 | 5 | 6 | 7 | 8 | 9 | 10 | 11 | 12 | 13 |
| SSB | 120 kHz | 20 PRBs x 4 OS | | | | | 4 | 5 | 6 | 7 | 8 | 9 | 10 | 11 | 12 | 13 |
| RMSI | 60 kHz | 48 PRBs x 1 OS | 0 | 1 | 2 | 3 | | | | | | | | | | |
| | | | | | | | | | | | | | | | | |
| | | | 6 | 7 | 8 | 9 | 10 | 11 | 12 | 13 | 0 | 1 | 2 | 3 | 4 | 5 |
| | | | 5 | | | | | | | 12 | | | 8 | 9 | 10 | 11 | 12 | 13 |

| Signals | SCS | T/F Res. | OFDM Symbols | | | | | | | | | | | | | | |
|---|---|---|---|---|---|---|---|---|---|---|---|---|---|---|---|---|---|
| | | | 0 | 1 | 2 | 3 | 4 | 5 | 6 | 7 | 8 | 9 | 10 | 11 | 12 | 13 |
| SSB | 240 kHz | 20 PRBs x 4 OS | | | | | 4 | 5 | 6 | 7 | 8 | 9 | 10 | 11 | 12 | 13 |
| | | | | | | | 4 | 5 | 6 | 7 | 8 | 9 | 10 | 11 | 12 | 13 |
| RMSI | 120 kHz | 48 PRBs x 1 OS | 0 | 1 | 2 | 3 | | | | | | | | | | |
| | | | 0 | 1 | 2 | 3 | | | | | | | | | | |
| | | | 8 | 9 | 10 | 11 | 12 | 13 | 0 | 1 | 2 | 3 | 4 | 5 | 6 | 7 |
| | | | 4 | 5 | | | 12 | 13 | | | | | | | | |
| | | | 4 | 5 | 6 | 7 | 8 | 9 | 10 | 11 | 12 | 13 | | | | |

Fig. 3

MULTIPLEXING PDCCH PAGING OCCASION AND SS BURST

PRIORITY

This nonprovisional application is a U.S. National Stage Filing under 35 U.S.C. § 371 of International Patent Application Serial No. PCT/SE2019/050733 filed Aug. 9, 2019 and entitled "Multiplexing PDCCH Paging Occasion and SS Burst" which claims priority to U.S. Provisional Patent Application No. 62/716,685 filed Aug. 9, 2018 both of which are hereby incorporated by reference in their entirety.

TECHNICAL FIELD

Particular embodiments relate to wireless communication, and more specifically to using remaining minimum system information (RMSI) physical downlink control channel (PDCCH) monitoring patterns for paging occasions that overlap with synchronization signal (SS) burst sets.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Third Generation Partnership Project (3GPP) fifth generation (5G) systems (e.g., new radio (NR)) may use high carrier frequencies (e.g., in the range 24.25-52.6 GHz). For such high frequency spectrum, the atmospheric, penetration and diffraction attenuation properties may be worse than for lower frequency spectrum. In addition, the receiver antenna aperture, as a metric describing the effective receiver antenna area that collects the electromagnetic energy from an incoming electromagnetic wave, is inversely proportional to the frequency (i.e., the link budget is worse for the same link distance even in a free space scenario when using omnidirectional receive and transmit antennas).

The network may use beamforming to compensate for the loss of link budget in high frequency spectrum. This is particularly important when communicating with user equipment (UEs) with poor receivers (e.g., low cost/low complexity UEs). Other means for improving the link budget include repetition of the transmissions (e.g., to facilitate wide beam or omnidirectional transmission) or use of single frequency network transmission from multiple transmission reception points (TRPs) in the same or different cells.

Because of the above described properties, in the high frequency bands, many downlink signals, such as synchronization signals, system information, and paging, which need to cover a certain area (i.e., not targeting a single UE with known location/direction, but an entire cell for example), are transmitted using beam sweeping (i.e., transmitting the signal in one beam at a time, sequentially changing the direction and coverage area of the beam until the entire intended coverage area, e.g. the cell, has been covered by the transmission).

The signals and channels in NR that correspond to the primary synchronization signal (PSS), secondary synchronization signal (SSS), cell-specific reference signal (CRS) and physical broadcast channel (PBCH) (which carries the master information block (MIB) and layer 1 generated bits) in long term evolution (LTE), i.e. PSS, SSS, demodulation reference signal (DMRS) for PBCH and PBCH (sometimes referred to as NR-PSS, NR-SSS, DMRS for NR-PBCH and NR-PBCH in NR) are contained in an entity/structure referred to as a synchronization signal block (SSB) or a SS/PBCH block (the term SS Block is typically used in RAN2 while RAN1 usually uses the term SS/PBCH block). Thus, SS Block, SSB and SS/PBCH block are interchangeable.

The PSS+SSS enables a UE to synchronize with the cell and also carries information from which the UE can derive the physical cell identity (PCI). The PBCH part (including DMRS) of the SSB carries a part of the system information referred to as the master information block (MIB) or NR-MIB, eight layer-one generated bits, and the SSB index within the SS Burst Set. In high frequencies, SS Blocks are transmitted periodically using beam sweeping. Multiple such beamformed SS Block transmissions are grouped into an SS Burst Set which constitutes a full beam sweep of SS Block transmissions. When many beams are used, a transmitter inserts longer gaps, such as two or four slots (where each slot contains fourteen orthogonal frequency division multiplexing (OFDM) symbols) into the beam sweep. This effectively creates groups of SS Block transmissions within the SS Burst Set (which may also be referred to as SS Bursts).

NR divides the system information (SI) into two main parts referred to as minimum SI (MSI) and other SI (OSI). The MSI is periodically broadcast, whereas the OSI may be periodically broadcast or may be available on-demand (and different parts of the OSI may be treated differently). The MSI consists of the MIB and system information block type 1 (SIB1), where SIB1 is also referred to as remaining minimum system information (RMSI) (the term SIB1 is typically used by RAN2, while RAN1 usually uses the term RMSI). The terms RAN1, RAN2, RAN3 and RAN4 refer to 3GPP working groups, more formally referred to as TSG-RAN WG1, TSG-RAN WG2, TSG-RAN WG3 and TSG-RAN WG4.

SIB1/RMSI is periodically broadcast using a physical downlink control channel (PDCCH) and physical downlink shared channel (PDSCH)-like channel structure (i.e., with a scheduling allocation transmitted on the PDCCH (or NR-PDCCH) allocating transmission resources on the PDSCH (or NR-PDSCH) where the actual RMSI is transmitted). The MIB contains information that enables a UE to find and decode RMSI/SIB1. More specifically, configuration parameters for the PDCCH used for the RMSI/SIB1 are provided in the MIB (when an associated RMSI/SIB1 exists), possibly complemented by parameters derived from the PCI.

The RMSI/SIB1 transmissions may be spatially quasi co-located (QCL) with the SS Block transmissions. A consequence of the QCL property is that the PSS/SSS transmission can be relied on for accurate synchronization to be used when receiving the PDCCH/PDSCH carrying the RMSI/SIB1.

Paging and OSI are also transmitted using the PDCCH and PDSCH principle with PDSCH downlink scheduling allocation on the PDCCH and paging message or SI message on the PDSCH. An exception is that paging information may optionally be conveyed in the paging downlink control information (DCI) on the PDCCH, thus skipping the paging message on the PDSCH. The DCI may be used when paging is used for notification of emergency earthquake and tsunami warning system (ETWS), commercial mobile alert system (CMAS), or SI update. In the future, other paging scenarios may also use the PDCCH only transmission mechanism.

The configuration information for the PDCCH used for paging and the PDCCH used for OSI transmission is included in the RMSI/SIB1. For both paging and OSI, the same control resource set (CORESET) (i.e., the control resource set for Type0-PDCCH common search space) may be used for RMSI/SIB1 if the UE is not provided by dedicated higher layer signaling with a control resource set for Type0A-PDCCH common search space (for OSI) or for Type2-PDCCH common search space (for paging).

In the RMSI/SIB1 for a primary cell or in dedicated signaling for other serving cells (as specified in 3GPP TS 38.331), the search space (i.e., the time windows and time repetition pattern) for paging is indicated in the pagingSearchSpace parameter while the OSI search space is indicated in the searchSpaceOtherSystemInformation parameter (which corresponds to the SearchSpace-OSI parameter in 3GPP TS 38.213). If the configuration information for the PDCCH for paging is not available in the RMSI/SIB1 or by dedicated signaling (i.e., if the pagingSearchSpace parameter is not present in the RMSI/SIB1 or not signaled via dedicated signaling), then the monitoring windows/monitoring occasions for the PDCCH (i.e., essentially the search space) are the same as those configured for RMSI/SIB1.

The pagingSearchSpace parameter contains a SearchSpaceId, which identifies a set of parameters that constitute a PDCCH search space configuration. For simplicity, the term pagingSearchSpace may be used to refer to the set of parameters that configure the PDCCH search space for paging.

Paging is an essential function in a mobile telecommunications system. It enables the network to contact a UE while in RRC_IDLE or RRC_INACTIVE state, primarily to transmit downlink data to the UE after the UE has responded to the page. Paging can also be used to inform UEs of updates of the system information in a cell. It can also be used for informing UEs of an ongoing public warning such as ETWS or CMAS.

In LTE, a UE in RRC_IDLE state camps on a cell and while camping monitors the paging channel associated with that cell. The UE is configured to monitor repeatedly occurring paging occasions and may reside in a discontinuous reception (DRX) sleep mode between the paging occasions. When the network pages the UE at such a paging occasion, the UE receives the paging indication on the PDCCH in the form of a downlink scheduling allocation addressed to the paging radio network temporary identifier (P-RNTI) (which is shared by all UEs). The downlink scheduling allocation indicates the downlink transmission resources on the PDSCH where the network transmits the actual paging message.

A UE in RRC_IDLE state, which receives a downlink scheduling allocation addressed to the P-RNTI at one of the UE's paging occasions, receives and reads the paging message from the allocated downlink transmission resources to determine whether the paging message is intended for the UE. The UE(s) that is(are) subject to the paging is(are) indicated in the paging message through one or more UE paging identifiers (e.g., system architecture evolution (SAE) temporary mobile subscriber identity (S-TMSI) or international mobile subscriber identity (IMSI)), wherein each UE paging identifier is included in a paging record. Up to sixteen UEs may be addressed (i.e., one paging message may include up to sixteen paging records).

Most of the paging principles and mechanisms described above are also used in NR. NR includes an additional state referred to as RRC_INACTIVE state, for which paging is also relevant. Future versions of LTE may also include the RRC_INACTIVE state.

The purpose of the RRC_INACTIVE state in addition to the RRC_IDLE state is to provide a low-energy state with reduced signaling overhead over the radio and network interfaces and improved UE access latency as well as UE energy consumption when the UE moves from an energy saving state to a state designed for transmission and reception of user data (i.e., RRC_CONNECTED state). In this state, the core network still regards the UE as connected and thus the radio access network (RAN) to core network (CN) connection is kept active, while the radio resource control (RRC) connection between the gNB and the UE is released. The UE's RAN context is maintained in the anchor gNB and the RAN-CN connection is maintained between the anchor gNB and the core network.

To reduce radio interface signaling at connection establishment, the context information is kept active in the UE and in the anchor gNB which enables the UE to resume the RRC connection when it is paged from the RAN or has uplink data or signaling to send. In this state, the UE can move around in a RAN notification area (RNA) without informing the network of its whereabouts, but when it leaves its configured RNA, the UE informs the network.

In NR, paging can thus be used for a UE in either RRC_IDLE state or RRC_INACTIVE state. In RRC_IDLE state, the paging is initiated by the core network, while paging of a UE in RRC_INACTIVE state is initiated by the RAN (the anchor gNB).

A UE in RRC_INACTIVE state is prepared to receive paging initiated by either the RAN or the CN. Normally, paging of a UE in RRC_INACTIVE state is initiated by the RAN, but in cases of state mismatch between the UE and the core network, the core network may initiate paging of a UE that considers itself to be in RRC_INACTIVE state.

For core network initiated paging, the UE ID used in the paging message is the 5G-S-TMSI in NR (replacing the S-TMSI that is used in LTE). The IMSI is used only in rare error cases where the 5G-S-TMSI is not available. For RAN initiated paging, the UE ID used in the paging message is the inactive RNTI (I-RNTI) (which is assigned by the anchor gNB). The same paging message is used over the radio interface for both core network initiated and RAN initiated paging. The type of UE ID informs the UE of whether the core network or the RAN initiated the page.

The UE needs to know how the page was initiated because the UE performs differently depending on which entity initiated the page. In response to core network initiated paging (excluding ETWS/CMAS/SI update notification), the UE contacts the network (through random access) and requests establishment of a new RRC connection (including a non-access stratum (NAS) Service Request message). In response to RAN initiated paging (excluding ETWS/CMAS/SI update notification), the UE contacts the network (through random access) and requests to resume an existing (suspended) RRC connection. Another difference between LTE and NR is that the maximum number of UE IDs (i.e., paging records) that may be included in a paging message increases from 16 in LTE to 32 in NR.

As described above, NR may transmit paging using beamforming transmission on high carrier frequencies (e.g., multi-GHz frequencies) and especially on higher frequencies, such as frequencies above 20 GHz. Thus, the network my use beam sweeping to cover an entire cell with the page. To support beam sweeping of paging transmissions, a paging occasion (PO) in NR can consist of multiple timeslots to accommodate all the paging transmissions of the beam sweep. This is configured in the system information.

A paging occasion is a regularly recurring time window during which paging may be transmitted. Different UEs can be allocated to different POs and a UE is expected to monitor the paging channel (i.e., the PDCCH configured for paging) during its allocated PO. A radio frame that contains one or more PO(s) is referred to as a paging frame (PF).

In both LTE and NR, the time interval between two POs for a certain UE is governed by a paging DRX cycle (referred to as DRX cycle). One PO is allocated to the UE during each DRX cycle. The UE is aware of all POs, but selects one based on its UE ID. Unless the UE is configured with an extended DRX (eDRX) cycle, the DRX cycle a UE uses is the shortest of the default DRX cycle (also referred to as the default paging cycle), which is announced in the system information (and denoted defaultPagingCycle), or a UE specific DRX cycle negotiated with the core network. For UEs which are not configured with any type of extended DRX cycle, the shortest of the default DRX cycle and the UE specific DRX cycle (if available) is used. In NR, a UE may also be configured with a DRX cycle to be used in RRC_INACTIVE state. The DRX cycle is assigned to the UE when the UE moves to RRC_INACTIVE state.

Within the DRX cycle a UE calculates, based on its UE ID, a paging frame and which out of possibly multiple (1, 2 or 4 in LTE) PO(s) in the paging frame that the UE should monitor. In LTE and NR, IMSI mod 1024 is used for the calculation. However, because of security/privacy issues related to the use of the IMSI for this purpose, NR may use the 5G-S-TMSI in the formula.

In LTE the paging frames for a UE are the radio frames with system frame numbers (SFNs) satisfying the following equation: SFN mod T=(T div N)*(UE_ID mod N), where T is the DRX cycle (default or UE specific); N is the min(T, nB) (i.e., N is the number of paging frames in a DRX cycle.); nB is 4T, 2T, T, T/2, T/4, T/8, T/16, T/32, T/64, T/128, T/256 (the number of POs in a DRX cycle); and UE_ID is IMSI mod 1024. The nB values T/64, T/128 and T/256 were added in release 15 of LTE. NR may restrict the nB values to 4T, 2T, T, T/2, T/4, T/8 and T/16 or may remove the nB parameter from the PF/PO algorithm of NR and instead make the N and Ns parameters independently configurable in the system information.

The formula may be reused or modified for NR. One modification uses an offset for shifting of paging frames, which results in the following modified formula for paging frame calculation (with the definitions of T, N, nB and UE_ID unchanged): (SFN+PF_offset) mod T=(T div N)*(UE_ID mod N).

Within a paging frame, the PO(s) is/are configured/allocated based on a table in LTE, where the UE ID determines which of the PO(s) a UE should monitor. In detail, the LTE algorithm is as follows:

The subframe, which constitutes a UE's PO within a PF is determined by the following table:

| Ns | PO (i.e. subframe) when i_s = 0 | PO (i.e. subframe) when i_s = 1 | PO (i.e. subframe) when i_s = 2 | PO (i.e. subframe) when i_s = 3 |
|---|---|---|---|---|
| 1 | 9 | N/A | N/A | N/A |
| 2 | 4 | 9 | N/A | N/A |
| 4 | 0 | 4 | 5 | 9 |

Where the parameters in the table above are: Ns is max(1, nB/T) (i.e., Ns is the number of POs in a PF), and i_s is floor(UE_ID/N) mod Ns (i_s is an index pointing out a certain UE's PO within a PF).

As understood from the above algorithm and table, i_s is an index that points out which of the PO(s) in a paging frame that a UE should use, wherein the PO(s) are indexed (i.e., is has the range) from 0 to Ns−1. The table determines the allocation of PO(s) to subframe(s) within a paging frame.

The above is thus the LTE algorithm for configuration of POs in a paging frame, which is also the baseline for NR. As explained further below, however, the algorithm is not fully suitable for NR and may not be reused in its entirety for NR.

LTE and NR also include a difference in the time domain structure of L1 of the radio interface. While LTE always has the same structure, NR may have different structures, because it includes different numerologies (which essentially can be translated to different subcarrier spacings (SCSs) and consequent differences in the time domain, e.g. the length of an OFDM symbol). In LTE, the L1 radio interface time domain structure consists of symbols, subframes and radio frames, where a one ms subframe consists of fourteen symbols (twelve if extended cyclic prefix is used) and ten subframes form a ten ms radio frame.

In NR, the concepts of subframes and radio frames are reused in the sense that they represent the same time periods, i.e. one ms and ten ms respectively, but their internal structures vary depending on the numerology. For this reason, the additional term "slot" is used in NR, which is a time domain structure that contains fourteen symbols (for normal cyclic prefix), irrespective of the symbol length. Thus, the number of slots and symbols comprising a subframe and a radio frame vary with the numerology, but the number of symbols in a slot remains consistent. The numerologies and parameters are chosen such that a subframe always contains an integer number of slots (i.e. no partial slots). The term "slot", as used in NR, refers to a set of fourteen OFDM symbols. The term "slot" is also used with respect to LTE where it refers to half a subframe, (i.e., 0.5 ms containing seven OFDM symbols (or six OFDM symbols in when extended cyclic prefix is used)).

Returning to the PO allocation, the table-based configuration/allocation used in LTE cannot be readily reused in NR. In LTE it was simple to map a PO to a subframe through a table specified for this purpose. In NR, however, a PO cannot simply be mapped to a subframe. In terms of transmission resources, a subframe is an unambiguous concept in LTE (with the only variation being normal or extended cyclic prefix). In NR the transmission resources (in terms of slots and thus OFDM symbols) vary with different numerologies (i.e., subcarrier spacings, SCSs). In addition, the duration of a PO in NR is variable and depends on the number of beams needed in a possible beam sweep for the PDCCH for paging in combination with the SCS and consequent symbol length.

For these reasons, NR replaces the table-based PO configuration mechanism of LTE with a mechanism based on the pagingSearchSpace information element. The Ns and i_s parameters are retained, but they no longer identify subframes in a paging frame. Rather, they identify sets of PDCCH monitoring occasions (constituting PDCCH beam sweeps) in a paging frame.

NR includes two main cases referred to as the default case and the non-default case. These refer to whether an explicit pagingSearchSpace parameter structure is configured through the system information or through dedicated signaling. If no such pagingSearchSpace parameter structure is available, a default allocation of the PO(s) within a paging frame is used. That is, in the default case, the PDCCH monitoring occasions corresponding to the PO(s) within a paging frame are determined according to a default association in relation to the SSB transmissions and the PDCCH monitoring occasions are then the same as for the RMSI as defined in section 13 in 3GPP TS 38.213. For the default case there can be 1 or 2 PO(s) in a paging frame (i.e., Ns can be equal to 1 or 2). If there are 2 POs in the paging frame, there is one PO in the first half frame (corresponding to i_s=0) and one PO in the second half frame (corresponding to i_s=1).

For the non-default case (i.e., with the pagingSearchSpace explicitly configured and the pagingSearchSpace parameter included in the RMSI/SIB1 or dedicated signaling), one approach is to use the pagingSearchSpace parameter structure (i.e., the parameters identified by the SearchSpaceId of the pagingSearchSpace parameter) to define POs within a paging frame.

The pagingSearchSpace configures a time domain pattern for PDCCH monitoring occasions, at which a UE should monitor the PDCCH for paging transmissions (i.e., a DCI with a cyclic redundancy check (CRC) scrambled with the P-RNTI) in the CORESET configured for paging, which is associated with the pagingSearchSpace. The pagingSearchSpace is one instance of the SearchSpace information element (IE) (as defined in TS 38.331) and it contains the following parameters that define the time domain pattern for the PDCCH monitoring occasions.

The monitoringSlotPeriodicityAndOffset parameter defines a combination of periodicity and offset for slots containing PDCCH monitoring occasions. The two parts may be referred to as the "monitoring slot periodicity" and the "monitoring slot offset". A slot containing one or more PDCCH monitoring occasion(s) is denoted "monitoring slot".

The monitoringSymbolsWithinSlot parameter configures a pattern of OFDM symbol(s) within a slot, where each indicated symbol is the first symbol of a PDCCH monitoring occasion (i.e., the first of a set of consecutive symbols in which the UE should monitor the CORESET associated with the PDCCH for paging). The length of each PDCCH monitoring occasion in terms of symbols is determined by the length of the associated CORESET. That is, starting from an OFDM symbol indicated by the monitoringSymbolsWithinSlot parameter, a PDCCH monitoring occasion consists of a set of M consecutive OFDM symbols, where M is equal to the duration (in symbols) of the CORESET associated with the pagingSearchSpace. The duration of a CORESET, i.e. the CORESET's number of consecutive symbols, is defined by the duration parameter in the ControlResourceSet information element.

This duration parameter should not be confused with the duration parameter in the SearchSpace information element. The duration parameter in the ControlResourceSet information element has the range 1-3. The monitoringSymbolsWithinSlot parameter is a bitmap (or bit string) where each bit corresponds to a symbol in a slot. The most significant bit corresponds to the first symbol in the slot. A bit set to 1 indicates that the corresponding symbol is the first symbol of a PDCCH monitoring occasion. An OFDM symbol in which the UE should monitor the CORESET associated with the PDCCH for paging (i.e., an OFDM symbol belonging to a PDCCH monitoring occasion) is denoted "monitoring symbol".

An alternative use and interpretation of the monitoringSymbolsWithinSlot parameter is that it indicates all symbols (i.e. sets the corresponding bits to one) belonging to a PDCCH monitoring occasion, i.e. not just the first symbol of the PDCCH monitoring occasion. With this use and interpretation, each PDCCH monitoring occasion is indicated in the monitoringSymbolsWithinSlot parameter by setting the corresponding group of consecutive bits to 1, wherein the number of set bits is the same as the length of the CORESET associated with the PDCCH for paging.

The duration parameter defines a number of consecutive slots in which the monitoring symbol pattern of the monitoringSymbolsWithinSlot parameter is repeated. The duration parameter thus configures a group of monitoring slots (with the same monitoring symbol pattern) starting at the slot defined by the monitoring slot offset part of the monitoringSlotPeriodicityAndOffset parameter. The group of monitoring slots is repeated with the periodicity defined by the monitoring slot periodicity part of the monitoringSlotPeriodicityAndOffset parameter. For instance, if the monitoring slot offset=0, the monitoring slot periodicity=4 and duration=2, then the UE applies the PDCCH monitoring symbol pattern of the monitoringSymbolsWithinSlot parameter in slots 0, 1, 4, 5, 8, 9 . . . . The slot numbering starts at the first slot in the first radio frame in the system frame number range, i.e. a radio frame with system frame number (SFN) 0.

These parameters have the following ASN.1 specifications in 3GPP TS 38.331:

--ASN1START
--TAG-SEARCHSPACE-START
    SearchSpace::=SEQUENCE {
        searchSpaceId SearchSpaceId,
        controlResourceSetId ControlResourceSetId
OPTIONAL, --Cond SetupOnly
        monitoringSlotPeriodicityAndOffset CHOICE {
            sl1 NULL,
            sl2 INTEGER (0 . . . 1),
            sl4 INTEGER (0 . . . 3),
            sl5 INTEGER (0 . . . 4),
            sl8 INTEGER (0 . . . 7),
            sl10 INTEGER (0 . . . 9),
            sl16 INTEGER (0 . . . 15),
            sl20 INTEGER (0 . . . 19),
            sl40 INTEGER (0 . . . 39),
            sl80 INTEGER (0 . . . 79),
            sl160 INTEGER (0 . . . 159),
            sl320 INTEGER (0 . . . 319),
            sl640 INTEGER (0 . . . 639),
            sl1280 INTEGER (0 . . . 1279),
            sl2560 INTEGER (0 . . . 2559)
    } OPTIONAL, --
Cond Setup
    duration INTEGER (2 . . . 2559) OPTIONAL,
--Need R
    monitoringSymbolsWithinSlot BIT STRING (SIZE (14))
    OPTIONAL, --Cond Setup
    :
    :
    :
}
--TAG-SEARCHSPACE-STOP
--ASN1STOP Previous versions of TS 38.213 used different corresponding parameter names. The pagingSearchSpace in TS 38.331 corresponds to the paging-SearchSpace in TS 38.213. The monitoringSlotPeriodicityAndOffset parameter in TS 38.331 corresponds to the Monitoring-periodicity-PDCCH-slot and Monitoring-offset-PDCCH-slot parameters in TS 38.213 and the monitoringSymbolsWithinSlot parameter in TS 38.331 corresponds to the Monitoring-symbols-PDCCH-within-slot parameter in 3GPP TS 38.213. Version 15.2.0 of TS 38.213 adopts the parameter names used in TS 38.331.

The CORESET indicates the downlink transmission resources a UE should monitor during a PDCCH monitoring occasion. More specifically, a CORESET indicates a set of physical resource blocks (PRBs) in the frequency domain and 1-3 consecutive OFDM symbols in the time domain. The length of a PDCCH monitoring occasion is thus defined by the length (number of OFDM symbols) of the CORESET.

For example, if the length of the CORESET is three symbols and the monitoringSymbolsWithinSlot parameter (which is a bitmap) indicates the second symbol of a slot as the first symbol of a PDCCH monitoring occasion, then the UE monitors the CORESET in the second, third and fourth symbol of the slot. Furthermore, as mentioned above, each of the OFDM symbols is denoted "monitoring symbol" or "monitoring OFDM symbol" and a slot containing at least one monitoring symbol is denoted "monitoring slot". The CORESET associated with the PDCCH for paging is indicated by the controlResourceSetId parameter in the above ASN.1 SearchSpace definition.

With the alternative use and interpretation of the monitoringSymbolsWithinSlot parameter (i.e., that it indicates all symbols of each PDCCH monitoring occasion), the UE may still depend on the length of the CORESET to determine the duration of a PDCCH monitoring occasion. For example, if the length of the CORESET is three symbols and the monitoringSymbolsWithinSlot parameter indicates that six consecutive symbols belong to PDCCH monitoring occasions, then the UE can deduce from the duration of the CORESET (i.e., three symbols in this example) that the six indicated consecutive symbols must consist of two groups of three consecutive symbols, wherein each of the two groups constitute a PDCCH monitoring occasion in which the CORESET should be monitored.

Further details on the use of the search space parameters can be found in TS 38.213. Section 10.1 (from version 15.1.0 of the specification) includes the following formula. For search space set s in control resource set p, the UE determines that a PDCCH monitoring occasion(s) exists in a slot with number $n_{s,f}^{\mu}$ (TS 38.211) in a frame with number $n_f$ if $(n_f N_{slot}^{frame,\mu} + n_{s,f}^{\mu} - o_{p,s})\bmod k_{p,s} = 0 (n_f N_{slot}^{frame,\mu} + n_{s,f}^{\mu} - o_{p,s})\bmod k_{p,s} = 0$.

In this formula $k_{p,s}$ is the monitoring slot periodicity, $o_{p,s}$ is the monitoring slot offset and the other parameters are defined in TS 38.211 as follows: $N_{slot}^{frame,\mu}$ is the number of slots per frame for subcarrier spacing configuration μ (see clause 4.3.2 in TS 38.211); $n_{s,f}^{\mu}$ is the slot number within a frame for subcarrier spacing configuration μ (see clause 4.3.2 in TS 38.211); and μ is the subcarrier spacing configuration, $\Delta f = 2^{\mu} \cdot 15$ [kHz].

One proposal is that each paging beam transmission matches one PDCCH monitoring occasion, as defined by the pagingSearchSpace and that, assuming $N_{beams}$ beams, the first $N_{beams}$ PDCCH monitoring occasions in the paging frame constitute the first PO in the paging frame, the subsequent $N_{beams}$ PDCCH monitoring occasions in the paging frame constitute the second PO in the paging frame, etc. Some proposals may exclude PDCCH monitoring occasions that conflict with uplink slots/symbols (in time division duplex (TDD) operation). The remaining PDCCH monitoring occasions are called "useful paging PDCCH monitoring occasions" and the $N_{beams}$ parameter count useful paging PDCCH monitoring occasions rather than all configured PDCCH monitoring occasions.

Some proposals remove the restriction that multiple POs per paging frame can be configured only when all radio frames are paging frames. To this end, the nB parameter may no longer be used and Ns (which is the number of POs per paging frame) and N (which is the number of paging frames in a paging DRX cycle) are configurable independently of each other and provided in the system information.

For example, some proposals may define a useful paging PDCCH monitoring occasion as a monitoring occasion that does not conflict with uplink slots/symbols. For non-default association, one PO comprises 'N' useful paging PDCCH monitoring occasion where 'N' is equal to number of actual transmitted SSBs. The Kth monitoring occasion in the PO may correspond to the Kth transmitted SSB.

Also, for non-default association, (i_s+1)th PO is a set of N consecutive useful paging PDCCH monitoring occasions for paging starting from the (i_s*N)th PDCCH monitoring occasion. The useful paging PDCCH monitoring occasions starting from the first useful paging PDCCH monitoring occasion for paging in the paging frame are sequentially numbered from zero. Some proposals may include an additional parameter to indicate the first PDCCH monitoring occasion of each PO in a paging frame. Some proposals support configuration of Ns and N values instead of nB.

NR may increase the maximum number of UE IDs (i.e., paging records) that can be included in a paging message from sixteen in LTE to thirty-two. NR may also describe paging according to the following terminology.

A UE may use DRX in RRC_IDLE and RRC_INACTIVE state to reduce power consumption. The UE monitors one PO per DRX cycle. A PO is a set of PDCCH monitoring occasions and can consist of multiple time slots (e.g., subframe or OFDM symbol) where paging DCI can be sent. One paging frame is one radio frame and may contain one or multiple PO(s) or starting point of a PO.

In multi-beam operations, the length of one PO is one period of beam sweeping and the UE can assume that the same paging message is repeated in all beams of the sweeping pattern. Thus, the selection of the beam(s) for the reception of the paging message is up to UE implementation. The paging message is the same for both RAN initiated paging and core network initiated paging.

The UE initiates a RRC connection resume procedure upon receiving RAN paging. If the UE receives core network initiated paging in RRC_INACTIVE state, the UE moves to RRC_IDLE and informs NAS. The following formulae may be used to determine PF and PO.

The SFN for the PF is determined by: (SFN+PF_offset) mod T=(T div N)*(UE_ID mod N). Index (i_s), indicating the start of a set of PDCCH monitoring occasions for the paging DCI, is determined by: i_s=floor (UE_ID/N) mod Ns.

The PDCCH monitoring occasions for paging are determined according to paging-SearchSpace if configured. Otherwise, the PDCCH monitoring occasions for paging are determined according to the default association (i.e., the PDCCH monitoring occasions for paging are the same as for RMSI).

For default association, Ns is either 1 or 2. For Ns=1, there is only one PO that starts in the paging frame. For Ns=2, PO is either in the first half frame (i_s=0) or the second half frame (i_s=1) of the paging frame.

For non-default association (i.e., when paging-SearchSpace is used), the UE monitors the $(i\_s+1)^{th}$ PO where the first PO starts in the paging frame. The PDCCH monitoring occasions for paging that do not overlap with uplink symbols are sequentially numbered from zero starting from the first PDCCH monitoring occasion for paging in the paging frame. The $(i\_s+1)^{th}$ PO is a set of 'S' consecutive PDCCH monitoring occasions for paging starting from the $(i\_s*S)^{th}$ PDCCH monitoring occasion for paging where 'S' is the number of actual transmitted SSBs determined according to ssb-PositionsInBurst in SystemInformationBlock1. The $K^{th}$ PDCCH monitoring occasion for paging in the PO corresponds to the $K^{th}$ transmitted SSB.

The following parameters are used for the calculation of paging frame and i_s above. T is the DRX cycle of the UE (T is determined by the shortest of the UE specific DRX value, if configured by RRC or upper layers, and a default DRX value broadcast in system information. If UE specific DRX is not configured by upper layers, the default value is applied. N is the number of total paging frames in T. Ns is the number of paging occasions for a PF. PF_offset is the offset used for PF determination. UE_ID is IMSI mod 1024. Parameters N, Ns, PF_offset, and the length of default DRX Cycle are signaled in SystemInformationBlock1.

If the UE has no IMSI, for example when making an emergency call without a universal subscriber identity module (USIM), the UE shall use as default identity UE_ID=0 in the PF and i_s formulas above.

IMSI is given as sequence of digits of type Integer (0 . . . 9). IMSI shall in the formulae above be interpreted as a decimal integer number, where the first digit given in the sequence represents the highest order digit. For example, IMSI=12 (digit1=1, digit2=2). In the calculations, this shall be interpreted as the decimal integer "12", not "1×16+2=18".

SUMMARY

Based on the description above, certain challenges currently exist with paging occasions that overlap with synchronization signal (SS) burst sets. For example, with the current paging frame (PF)/paging occasion (PO) algorithm for the non-default case, paging frames may or may not coincide with SS block (SSB) frames (i.e., frames containing SS Burst Sets) and POs may or may not overlap/coincide with SS Burst Sets.

If SS Burst Sets are more frequent than paging frames, then either every paging frame will coincide with an SSB frame or no paging frame will coincide with an SSB frame. On the other hand, if paging frames are more frequent than SS Burst Sets, then a mixture may occur where some paging frames coincide with SSB frames and some do not. In the special case where all radio frames are paging frames, such a mixture of paging frames coinciding with SSB frames and paging frames not coinciding with SSB frames cannot be avoided if the SS Burst Set periodicity is greater than ten milliseconds (ms).

There will thus be scenarios where some paging frames coincide with SSB frames and some paging frames do not. Consequently, some POs will overlap-partly or fully (e.g., coinciding)—with SS Burst Sets, while other POs will not.

The possibility to let a PO coincide with SS Burst Set and transmit the paging transmissions (e.g., the physical downlink control channel (PDCCH) transmissions) frequency-multiplexed with the SSBs has been proposed as a feature with potential benefits from both a user equipment (UE) perspective and a network perspective. When a base station, such as a gNB, uses analog transmit beamforming and can only transmit in one beam direction at a time, transmitting paging transmissions frequency-multiplexed with SSBs efficiently uses the downlink transmission resources (which otherwise risk being wasted, unless the network opportunistically can schedule a downlink transmission in the beam direction of the SSB transmission). From the UE's perspective, frequency-multiplexing of SSBs and paging transmissions (e.g., PDCCH transmissions (and/or physical downlink shared channel (PDSCH) transmissions)) facilitates the UE receiving the SSB (e.g., to acquire/tune downlink synchronization) and the paging transmission simultaneously, thus facilitating a shorter wake time for the UE than if the SSB and the paging transmission are received separately (i.e., separated in time).

When some POs overlap (e.g., coincide) with SS Burst Sets, however, configuration of the paging transmission pattern (i.e., the PDCCH monitoring pattern) becomes a problem. For a PO overlapping with a SS Burst Set, the paging transmissions (PDCCH and/or PDSCH) should be frequency-multiplexed with the SSB transmissions to realize the above described benefits associated with POs overlapping/coinciding with SS Burst Sets. But the currently specified pagingSearchSpace parameters do not allow configuration of a PDCCH monitoring pattern that matches the SSB transmission pattern in most SS Burst Set configurations. A problem is that the pagingSearchSpace parameters cannot configure different PDCCH monitoring patterns in different slots. Groups of slots with PDCCH monitoring occasions can be configured with one or more "empty" slot (i.e., a slot without any PDCCH monitoring occasion) in between, but the same monitoring symbol pattern will be repeated in all slots containing PDCCH monitoring occasions.

This property of the pagingSearchSpace configuration does not match all the SSB transmission patterns in SS Burst Sets (which are illustrated in FIG. 1).

FIG. 1 illustrates SSB transmission patterns for various subcarrier spacing. Each slot includes 14 orthogonal frequency division multiplexing (OFDM) symbols. The patterns for 15, 30, and 120 kHz subcarrier spacing are illustrated with two consecutive slots, slot n and slot n+1. Each slot includes two SSBs and the pattern is repeated a number of times depending on the total number of SSBs in the SS Burst Set. The pattern for 240 kHz spacing is illustrated over four consecutive slots, slot n, slot n+1, slot n+2, and slot n+3. Each pair of slots includes four SSBs and the pattern is repeated a number of times depending on the total number of SSBs. The shaded OFDM symbols represent the SSBs, where like shading in four consecutive OFDM symbols represents OFDM symbols belonging to the same SSB.

As illustrated in FIG. 1, in SS Burst Sets containing more than two SSBs, different OFDM symbols are used for SSB transmissions in consecutive slots in most of the possible transmission patterns. These patterns cannot be matched by the pagingSearchSpace configuration, and thereby PO/paging configurations where the paging transmissions (PDCCH and/or PDSCH) are frequency-multiplexed with SSB transmissions are precluded for the non-default case (i.e., the PO/paging configuration option where the pagingSearchSpace is used).

Certain aspects of the present disclosure and their embodiments may provide solutions to these or other challenges. To overcome the above described problem that the PO/paging transmission configuration means available for the non-default case cannot be used to configure frequency-multiplexed transmission of paging (PDCCH and/or PDSCH) and SSB, particular embodiments leverage configurations resulting in frequency-multiplexing of remaining minimum system information (RMSI) and SSB in accordance with the CORESET-SSB multiplexing patterns 2 and 3 specified in Chapter 13 of 3GPP TS 38.213. These specifications can be reused for paging transmissions, effectively replacing either the PDCCH monitoring occasion configuration or both the PDCCH monitoring occasion configuration and the CORESET configuration in any pagingSearchSpace parameter structure provided in the system information.

If a PO, as configured by the PF/PO algorithm, is placed such that it at least partly overlaps with an SS Burst Set, then the PO may be moved (if needed) to coincide with the SS Burst Set and either the PDCCH monitoring occasion configuration or both the PDCCH monitoring occasion configuration and CORESET configuration for CORESET-SSB multiplexing pattern 2 or CORESET-SSB multiplexing pattern 3 (as specified for RMSI in chapter 13 of 3GPP TS 38.213) may be used for the paging transmissions, thereby resulting in frequency-multiplexing of paging transmissions and SSB transmissions. The conditional modification of the of the search space configuration for POs overlapping with SS Burst Sets is a technical improvement to the regular PF/PO configuration algorithm and search space configuration for paging.

In general, particular embodiments may reuse the PDCCH monitoring occasion definitions and optionally the CORESET definitions specified for CORESET-SSB multiplexing patterns 2 and 3 to enable frequency-multiplexing of POs and SS Burst Sets (and thus frequency-multiplexing of paging transmissions (PDCCH and/or PDSCH) and SSB transmissions) for the non-default case. A component of particular embodiments is to extend the PF/PO configuration/allocation algorithm with a rule stating that if a PO, as configured/allocated by the regular PF/PO configuration/allocation algorithm, is placed such that it at least partly overlaps with an SS Burst Set, then either the PDCCH monitoring occasion configuration or both the PDCCH monitoring occasion configuration and the CORESET configuration as configured by the pagingSearchSpace parameters are replaced by the corresponding configuration(s) for either CORESET-SSB multiplexing pattern 2 or 3, or any other suitable pattern. The PO is effectively moved (if needed) to coincide with the SS Burst Set. Whether the rule should be applied may be configurable, for example, via the system information or any other suitable configuration.

The alternative PDCCH monitoring occasion and optionally CORESET configuration(s), in accordance with particular embodiments, may be separately applied for each PO that is to be frequency-multiplexed with an SS Burst Set. That is, the SSB periodicity, which is "inherited" into the PDCCH monitoring occasion specifications for CORESET-SSB multiplexing pattern 2 and 3 in section 13 of 3GPP TS 38.213, may be ignored when particular embodiments are used. Instead, the periodicity may be equal to the paging DRX cycle as usual.

According to some embodiments, a method performed by a wireless device of receiving paging occasions and synchronization signals in a carrier frequency band comprises obtaining a first paging occasion configuration and a first synchronization signal configuration and determining that a paging occasion specified by the first paging occasion configuration at least partially overlaps in time with a synchronization signal specified by the first synchronization signal configuration. The method further comprises modifying at least one of (a) the paging occasion configuration for the overlapping paging occasion and (b) the synchronization signal configuration for the overlapping synchronization signal to frequency multiplex the paging occasion and the synchronization signal. The method further comprises receiving the paging occasion and the synchronization signal in the carrier frequency band according to the at least one of the modified paging occasion configuration and modified synchronization signal configuration.

In particular embodiments, the method further comprises obtaining configuration information indicating that the wireless device should determine whether a paging occasion at least partially overlaps in time with a synchronization signal. The obtained configuration information may indicate a frequency multiplexing pattern to use when the wireless device determines that a paging occasion at least partially overlaps in time with a synchronization signal.

In particular embodiments, modifying at least one of the paging occasion configuration and the synchronization signal configuration comprises modifying at least one of the paging occasion configuration and the synchronization signal configuration according to Third Generation Partnership Project (3GPP) fifth generation (5G) new radio (NR) CORESET-SSB multiplexing patterns 2 or 3.

In particular embodiments, determining that the paging occasion at least partially overlaps in time with the synchronization signal comprises determining that the paging occasion at least partially overlaps in time with the synchronization signal if a network node uses all synchronization signal beams specified by the 3GPP 5G NR standard specification for the carrier frequency band. In some embodiments it may comprise determining that the paging occasion at least partially overlaps in time with the synchronization signal plus a guard time or that the paging occasion occurs in the same slot as the synchronization signal. In some embodiments it may comprise determining that at least part of the paging occasion is located the same radio frame, or half frame, as the synchronization signal. In some embodiments the paging occasion comprises a plurality of monitoring occasions and determining that the paging occasion at least partially overlaps in time with the synchronization signal comprises determining that at least one monitoring occasion of the plurality of monitoring occasions at least partly overlaps in time with the synchronization signal. In some embodiments, the paging occasion comprises a plurality of monitoring occasions and the synchronization signal comprises a plurality of synchronization sequence transmissions, and determining that the paging occasion at least partially overlaps in time with the synchronization signal comprises determining that at least one monitoring occasion of the plurality of monitoring occasions at least partly overlaps in time with at least one of the synchronization sequence transmissions.

According to some embodiments, a wireless device is capable of receiving paging occasions and synchronization signals in a carrier frequency band. The wireless device comprises processing circuitry operable to perform any of the methods of the network node described above.

According to some embodiments, a method performed by a network node for transmitting paging occasions and synchronization signals in a carrier frequency band comprises obtaining a first paging occasion configuration and a first synchronization signal configuration and fdetermining that a paging occasion specified by the first paging occasion configuration at least partially overlaps in time with a synchronization signal specified by the first synchronization signal configuration. The method further comprises modifying at least one of the paging occasion configuration for the at least partially overlapping paging occasion and the synchronization signal configuration for the at least partially overlapping synchronization signal to frequency multiplex the paging occasion and the synchronization signal. The method further comprises transmitting the control channel and the synchronization signal in the carrier frequency band according to the at least one of the modified paging occasion configuration and modified synchronization signal configuration.

In particular embodiments, the method further comprises obtaining configuration information indicating that the network node should determine whether a paging occasion at least partially overlaps in time with a synchronization signal. The obtained configuration information may indicate a frequency multiplexing pattern to use when the network node determines that a paging occasion at least partially overlaps in time with a synchronization signal.

In particular embodiments, modifying at least one of the paging occasion configuration and the synchronization signal configuration comprises modifying at least one of the paging occasion configuration and the synchronization signal configuration according to 3GPP 5G NR CORESET-SSB multiplexing patterns 2 or 3.

In particular embodiments, determining that the paging occasion at least partially overlaps in time with the synchronization signal comprises determining that the paging occasion at least partially overlaps in time with the synchronization signal if a network node uses all synchronization signal beams specified by the 3GPP 5G NR standard specification for the carrier frequency band. In some embodiments it may comprise determining that the paging occasion at least partially overlaps in time with the synchronization signal plus a guard time or that the paging occasion occurs in the same slot as the synchronization signal. In some embodiments it may comprise determining that at least part of the paging occasion is located in the same radio frame, or half frame, as the synchronization signal. In some embodiments the paging occasion comprises a plurality of monitoring occasions and determining that the paging occasion at least partially overlaps in time with the synchronization signal comprises determining that at least one monitoring occasion of the plurality of monitoring occasions at least partly overlaps in time with the synchronization signal. In some embodiments, the paging occasion comprises a plurality of monitoring occasions and the synchronization signal comprises a plurality of synchronization sequence transmissions, and determining that the paging occasion at least partially overlaps in time with the synchronization signal comprises determining that at least one monitoring occasion of the plurality of monitoring occasions at least partly overlaps in time with at least one of the synchronization sequence transmissions.

According to some embodiments, a network node is capable of receiving paging occasions and synchronization signals in a carrier frequency band. The network node comprises processing circuitry operable to perform any of the network node methods described above.

According to some embodiments, a wireless device is capable of receiving paging occasions and synchronization signals in a carrier frequency band. The wireless device comprises an obtaining module, a determining module, modifying module, and receiving module. The obtaining module is operable to obtain a first paging occasion configuration and a first synchronization signal configuration. The determining module is operable to determine that a paging occasion specified by the first paging occasion configuration at least partially overlaps in time with a synchronization signal specified by the first synchronization signal configuration. The modifying module is operable to modify at least one of the paging occasion configuration for the at least partially overlapping paging occasion and the synchronization signal configuration for the at least partially overlapping synchronization signal to frequency multiplex the paging occasion and the synchronization signal. The receiving module is operable to receive the paging occasion and the synchronization signal in the carrier frequency band according to the at least one of the modified paging occasion configuration and modified synchronization signal configuration.

According to some embodiments, a network node is capable of transmitting paging occasions and synchronization signals in a carrier frequency band. The network node comprises an obtaining module, a determining module, modifying module, and receiving module. The obtaining module is operable to obtain a first paging occasion configuration and a first synchronization signal configuration. The determining module is operable to determine that a paging occasion specified by the first paging occasion configuration at least partially overlaps in time with a synchronization signal specified by the first synchronization signal configuration. The modifying module is operable to modify at least one of the paging occasion configuration for the at least partially overlapping paging occasion and the synchronization signal configuration for the at least partially overlapping synchronization signal to frequency multiplex the paging occasion and the synchronization signal. The transmitting module is operable to transmit the paging occasion and the synchronization signal in the carrier frequency band according to the at least one of the modified paging occasion configuration and modified synchronization signal configuration.

Also disclosed is a computer program product comprising a non-transitory computer readable medium storing computer readable program code, the computer readable program code operable, when executed by processing circuitry to perform any of the methods performed by the wireless device described above.

Another computer program product comprises a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments facilitate configuration of paging transmissions frequency-multiplexed with SSB transmissions for the non-default cases.

BRIEF DESCRIPTION OF THE DRAWINGS

For a more complete understanding of the disclosed embodiments and their features and advantages, reference is now made to the following description, taken in conjunction with the accompanying drawings, in which:

FIG. 3 is a more detailed illustration of CORESET-SSB multiplexing pattern 2;

DETAILED DESCRIPTION

As described above, certain challenges currently exist with paging occasions that overlap with synchronization signal (SS) burst sets. Certain aspects of the present disclosure and their embodiments may provide solutions to these or other challenges. Particular embodiments facilitate a PO coinciding with SS Burst Set and transmitting the paging transmissions (e.g., the physical downlink control channel (PDCCH) transmissions) frequency-multiplexed with the SS blocks (SSBs).

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

To overcome the problem where the paging opportunity/paging transmission configuration means available for the non-default case cannot be used to configure frequency-multiplexed transmission of paging (PDCCH and/or physical downlink shared channel (PDSCH)) and SSB, particular embodiments leverage the CORESET and PDCCH monitoring occasion configurations used for frequency-multiplexing of RMSI and SSB in accordance with CORESET-SSB multiplexing patterns 2 and 3 as specified in chapter 13 of 3GPP TS 38.213.

There are three CORESET-SSB multiplexing patterns for SSB and RMSI transmissions: pattern 1, 2 and 3 (where pattern 2 and 3 are of interest to particular embodiments). The three CORESET-SSB multiplexing patterns are illustrated in FIGS. 2 and 3.

Figure 1:
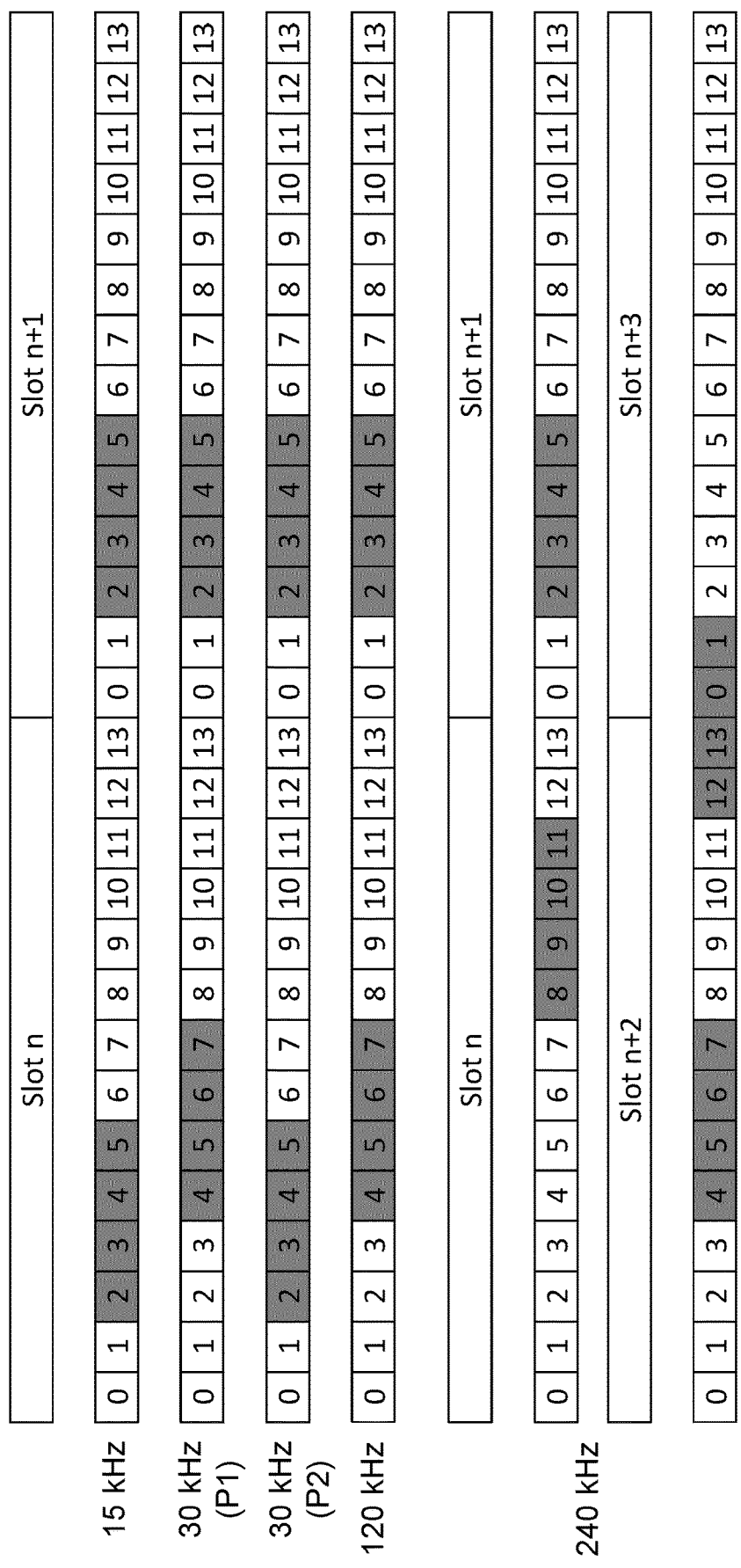
FIG. 1 illustrates SSB transmission patterns for various subcarrier spacing.
Figure 2:
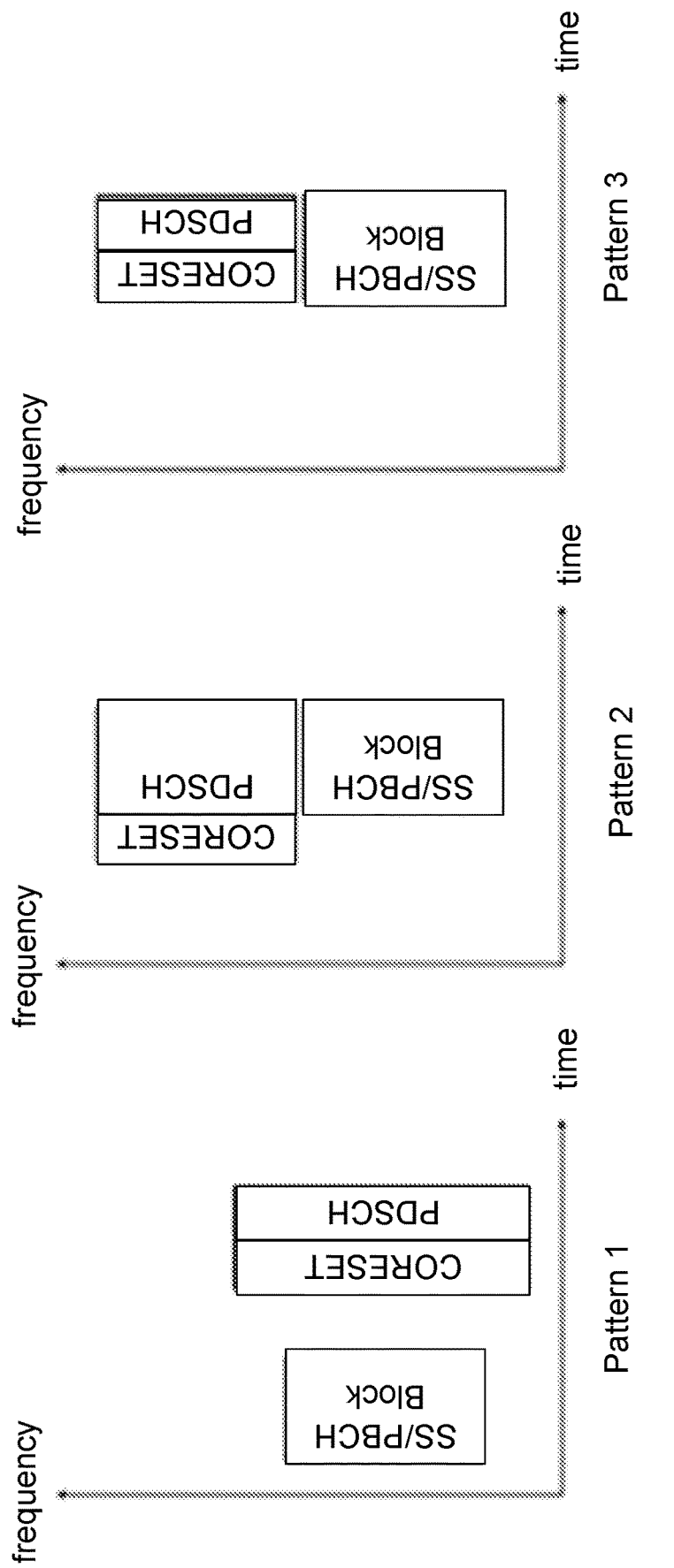
FIG. 2 is a time/frequency diagram illustrating CORESET-SSB multiplexing patterns 1, 2 and 3.

FIG. 2 is a time/frequency diagram illustrating CORESET-SSB multiplexing patterns 1, 2 and 3. For each pattern, the horizontal axis represents time and the vertical axis represents frequency.

As used herein, SSB and SS/physical broadcast channel (PDCH) are two terms that may refer to the same signal block. Patterns 2 and 3 are defined for frequency range two (FR2) (i.e., the frequency range 24250-52600 MHz). Pattern 1 may also be used in frequency range one (FR1) (i.e., the frequency range 450-6000 MHz). Patterns 2 and 3 illustrate the SS/PBCH Block multiplexed with the PDSCH in the frequency domain.

FIG. 3 is a more detailed illustration of CORESET-SSB multiplexing pattern 2. The rows labeled "RMSI" represent the CORESET (i.e., the superset of downlink time/frequency transmission resources within which the PDCCH is transmitted). Each shade indicates a beam direction and illustrate which PDCCH transmissions match the direction of a certain SSB transmission. Different SCSs are used for the SSB and the PDCCH. The PDSCH transmissions are not illustrated in FIG. 3 because the allocation of the PDSCH transmissions are generally more flexible and do not always adhere to what is illustrated in simplified FIG. 2.

The PDCCH monitoring occasion specifications are based on formulas and tables rather than the regular search space parameters that constitute a search space provided via the system information. 3GPP TS 38.213 describes the PDCCH monitoring occasions for RMSI for CORESET-SSB multiplexing pattern 2 and 3 is as follows.

For the SS/PBCH block and control resource set multiplexing patterns 2 and 3, a UE monitors PDCCH in the Type0-PDCCH common search space over one slot with Type0-PDCCH common search space periodicity equal to the periodicity of SS/PBCH block. For a SS/PBCH block with index i, the UE determines the slot index $n_c$ and $SFN_c$ based on parameter provided by Tables 13-13 through 13-15 (reproduced below).

TABLE 13-13

PDCCH monitoring occasions for
Type0-PDCCH common search space-
SS/PBCH block and control resource set
multiplexing pattern 2 and {SS/PBCH block,
PDCCH} subcarrier spacing {120, 60} kHz

| Index | PDCCH monitoring occasions (SFN and slot number) | First symbol index (k = 0, 1, ... 15) |
|---|---|---|
| 0 | $SFN_C = SFN_{SSB,i}$<br>$n_C = n_{SSB,i}$ | 0, 1, 6, 7 for<br>i = 4k, i = 4k + 1,<br>i = 4k + 2, i = 4k + 3 |

TABLE 13-13-continued

PDCCH monitoring occasions for
Type0-PDCCH common search space-
SS/PBCH block and control resource set
multiplexing pattern 2 and {SS/PBCH block,
PDCCH} subcarrier spacing {120, 60} kHz

| Index | PDCCH monitoring occasions (SFN and slot number) | First symbol index (k = 0, 1, ... 15) |
|---|---|---|
| 1 | | Reserved |
| 2 | | Reserved |
| 3 | | Reserved |
| 4 | | Reserved |
| 5 | | Reserved |
| 6 | | Reserved |
| 7 | | Reserved |
| 8 | | Reserved |
| 9 | | Reserved |
| 10 | | Reserved |
| 11 | | Reserved |
| 12 | | Reserved |
| 13 | | Reserved |
| 14 | | Reserved |
| 15 | | Reserved |

TABLE 13-14

PDCCH monitoring occasions for
Type0-PDCCH common search space-
SS/PBCH block and control resource set
multiplexing pattern 2 and {SS/PBCH block,
PDCCH} subcarrier spacing {240, 120} kHz

| Index | PDCCH monitoring occasions (SFN and slot number) | First symbol index (k = 0, 1, ..., 7) |
|---|---|---|
| 0 | $SFN_C = SFN_{SSB,i}$ $n_C = n_{SSB,i}$ or $n_C = n_{SSB,i} - 1$ | 0, 1, 2, 3, 0, 1 in i = 8k, i = 8k +1, i = 8k + 2, i = 8k +3, i = 8k + 6, i = 8k + 7 ($n_C = n_{SSB,i}$) 12, 13 in i = 8k +4, i = 8k +5 ($n_C = n_{SSB,i} - 1$) |
| 1 | | Reserved |
| 2 | | Reserved |
| 3 | | Reserved |
| 4 | | Reserved |
| 5 | | Reserved |
| 6 | | Reserved |
| 7 | | Reserved |
| 8 | | Reserved |
| 9 | | Reserved |
| 10 | | Reserved |
| 11 | | Reserved |
| 12 | | Reserved |

TABLE 13-14-continued

PDCCH monitoring occasions for
Type0-PDCCH common search space-
SS/PBCH block and control resource set
multiplexing pattern 2 and {SS/PBCH block,
PDCCH} subcarrier spacing {240, 120} kHz

| Index | PDCCH monitoring occasions (SFN and slot number) | First symbol index (k = 0, 1, ..., 7) |
|---|---|---|
| 13 | | Reserved |
| 14 | | Reserved |
| 15 | | Reserved |

TABLE 13-15

PDCCH monitoring occasions for
Type0-PDCCH common search space-
SS/PBCH block and control resource set
multiplexing pattern 3 and {SS/PBCH block,
PDCCH} subcarrier spacing {120, 120} kHz

| Index | PDCCH monitoring occasions (SFN and slot number) | First symbol index (k = 0, 1, ... 15) |
|---|---|---|
| 0 | $SFN_C = SFN_{SSB,i}$ $n_C = n_{SSB,i}$ | 4, 8, 2, 6 in i = 4k, i = 4k +1, i = 4k + 2, i = 4k + 3 |
| 1 | | Reserved |
| 2 | | Reserved |
| 3 | | Reserved |
| 4 | | Reserved |
| 5 | | Reserved |
| 6 | | Reserved |
| 7 | | Reserved |
| 8 | | Reserved |
| 9 | | Reserved |
| 10 | | Reserved |
| 11 | | Reserved |
| 12 | | Reserved |
| 13 | | Reserved |
| 14 | | Reserved |
| 15 | | Reserved |

Based on the searchSpaceZero parameter (which is a 4-bit index in the form of an INTEGER in the range 0-15 that is included in the leftmost column of the tables) in the PDCCH-ConfigSIB1 information element in the MIB, the UE derives the RMSI PDCCH monitoring occasions from the above tables.

The PDCCH-ConfigSIB1 information element is specified in TS 38.331 as follows:

```
-- ASN1START
-- TAG-PDCCH-CONFIGSIB1-START
PDCCH-ConfigSIB1 ::=            SEQUENCE {
    controlResourceSetZero          ControlResourceSetZero,
    searchSpaceZero                 SearchSpaceZero
}
-- TAG-PDCCH-CONFIGSIB1-STOP
-- ASN1STOP
```

PDCCH-ConfigSIB1 field descriptions controlResourceSetZero
Corresponds to the 4 LSB RMSI-PDCCH-Config in TS 38.213, section 13. Determines a common ControlResourceSet (CORESET) of initial downlink BWP.
searchSpaceZero
Corresponds to 4 MSB of RMSI-PDCCH-Config in TS 38.213, section 13. Determines a common search space of initial downlink BWP Furthermore, based on the controlResourceSetZero parameter (which is a 4-bit index in the form of an INTEGER in the range 0-15 that is included in the leftmost column of the tables) in the PDCCH-ConfigSIB1 information element in the MIB, the UE derives the CORESET for RMSI for CORESET-SSB multiplexing pattern 2 and 3 from table 13-7, 13-8 and 13-10 in TS 38.213. The tables are reproduced below.

TABLE 13-7

Set of resource blocks and slot symbols of control resource set for Type0-PDCCH search space when {SS/PBCH block, PDCCH} subcarrier spacing is {120, 60} kHz

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 0 | 1 | 48 | 1 | 0 |
| 1 | 1 | 48 | 1 | 8 |
| 2 | 1 | 48 | 2 | 0 |
| 3 | 1 | 48 | 2 | 8 |
| 4 | 1 | 48 | 3 | 0 |
| 5 | 1 | 48 | 3 | 8 |
| 6 | 1 | 96 | 1 | 28 |
| 7 | 1 | 96 | 2 | 28 |
| 8 | 2 | 48 | 1 | −41 if condition A, −42 if condition B |
| 9 | 2 | 48 | 1 | 49 |
| 10 | 2 | 96 | 1 | −41 if condition A, −42 if condition B |
| 11 | 2 | 96 | 1 | 97 |
| 12 | Reserved | | | |
| 13 | Reserved | | | |
| 14 | Reserved | | | |
| 15 | Reserved | | | |

TABLE 13-8

Set of resource blocks and slot symbols of control resource set for Type0-PDCCH search space when {SS/PBCH block, PDCCH} subcarrier spacing is {120, 120}kHz

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 4 |
| 2 | 1 | 48 | 1 | 14 |
| 3 | 1 | 48 | 2 | 14 |
| 4 | 3 | 24 | 2 | −20 if condition A, −21 if condition B |
| 5 | 3 | 24 | 2 | 24 |
| 6 | 3 | 48 | 2 | −20 if condition A, −21 if condition B |
| 7 | 3 | 48 | 2 | 48 |
| 8 | Reserved | | | |
| 9 | Reserved | | | |
| 10 | Reserved | | | |
| 11 | Reserved | | | |
| 12 | Reserved | | | |
| 13 | Reserved | | | |

TABLE 13-8-continued

Set of resource blocks and slot symbols of control resource set for Type0-PDCCH search space when {SS/PBCH block, PDCCH} subcarrier spacing is {120, 120}kHz

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 14 | Reserved | | | |
| 15 | Reserved | | | |

TABLE 13-10

Set of resource blocks and slot symbols of control resource set for Type0-PDCCH search space when {SS/PBCH block, PDCCH} subcarrier spacing is {240, 120} kHz

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 0 | 1 | 48 | 1 | 0 |
| 1 | 1 | 48 | 1 | 8 |
| 2 | 1 | 48 | 2 | 0 |
| 3 | 1 | 48 | 2 | 8 |
| 4 | 2 | 24 | 1 | −41 if condition A, −42 if condition B |
| 5 | 2 | 24 | 1 | 25 |
| 6 | 2 | 24 | 2 | −41 if condition A, −42 if condition B |
| 7 | 2 | 24 | 2 | 25 |
| 8 | 2 | 48 | 1 | −41 if condition A, −42 if condition B |
| 9 | 2 | 48 | 1 | 49 |
| 10 | 2 | 48 | 2 | −41 if condition A, −42 if condition B |
| 11 | 2 | 48 | 2 | 49 |
| 12 | Reserved | | | |
| 13 | Reserved | | | |
| 14 | Reserved | | | |
| 15 | Reserved | | | |

In particular embodiments, the specifications of the PDCCH monitoring occasions and CORESET for CORESET-SSB multiplexing pattern 2 and 3 can be reused for paging transmissions in the non-default case, effectively replacing or modifying any pagingSearchSpace configuration provided in the system information, when frequency-multiplexing of paging transmissions and SSB transmissions is desired for a PO. In some embodiments, only the PDCCH monitoring occasion configuration of the pagingSearchSpace is replaced. In some embodiments, both the PDCCH monitoring occasion configuration and the CORESET configuration of the pagingSearchSpace are replaced. In some embodiments, other frequency multiplexing patterns may be used for paging and SSB transmissions.

Particular embodiments include a conditional modification of search space configuration for paging for selected POs, which is an extension and improvement to the regular PF/PO configuration algorithm and search space configuration for paging. The alternative PDCCH monitoring occasion and optional CORESET configuration(s), according to the referenced specification, and in accordance with particular embodiments, may be separately applied for each PO that is to be frequency-multiplexed with an SS Burst Set. That is, the SSB periodicity that is "inherited" into the PDCCH monitoring occasion specifications for CORESET-SSB multiplexing pattern 2 and 3 in TS 38.213 may be ignored for particular embodiments. Instead, the periodicity may be equal to the paging DRX cycle as usual.

The search space configurations for CORESET-SSB multiplexing patterns 2 and 3 in TS 38.213 stipulates that the search space pattern matching a SS Burst Set has a periodicity equal to the SS Burst Set periodicity (i.e., the search space is repeated for every SS Burst Set). The specified periodicity is not relevant for paging, however, where a certain PO has a periodicity equal to the paging DRX cycle, which (with the configurable range according to 3GPP release 15) is greater than the SS Burst Set periodicity.

POs may be distributed where some POs are allocated between SS Burst Sets and others overlap or coincide with SS Burst Sets. In particular embodiments, the POs that are selected for the search space modification, if any, are the POs that are the closest to the SS Burst Sets (e.g., POs that at least partly overlap with SS Burst Sets).

In a particular embodiment, a PO that at least partly overlaps in time with an SS Burst Set has its search space configuration (as configured by the pagingSearchSpace parameters) modified by replacing the PDCCH monitoring configuration with either the PDCCH monitoring occasion configuration for CORESET-SSB multiplexing pattern 2 or the PDCCH monitoring occasion configuration for CORESET-SSB multiplexing pattern 3, or any other suitable frequency multiplexing pattern.

In some embodiments, a PO that at least partly overlaps in time with an SS Burst Set has its search space configuration (as configured by the pagingSearchSpace parameters) modified by replacing the PDCCH monitoring configuration and CORESET configuration with either the PDCCH monitoring occasion and CORESET configurations for CORESET-SSB multiplexing pattern 2 or the PDCCH monitoring occasion and CORESET configurations for CORESET-SSB multiplexing pattern 3, or any other suitable frequency multiplexing pattern.

Some embodiments include other (similar) criteria/conditions for selecting the POs (i.e., POs that should have the pagingSearchSpace modified by replacing the PDCCH monitoring occasion configuration or both the PDCCH monitoring configuration and CORESET configuration with the corresponding configuration(s) for RMSI for CORESET-SSB multiplexing pattern 2 or CORESET-SSB multiplexing pattern 3, or any other suitable frequency multiplexing pattern).

In general, a PO is a candidate for reconfiguration if the PO at least partly overlaps in time with the duration an SS Burst Set. Several examples are given below.

In some embodiments, a PO is a candidate for reconfiguration if the PO at least partly overlaps in time with the duration an SS Burst Set would have if all the possible SSB beams are used, as given by the specified maximum number of SSB beams for the carrier frequency band used in the concerned network deployment. If all the allowed SSB beams are used, this condition is the same as the above described embodiment where a PO at least partly overlaps with an SS Burst Set.

In another example, a PO is a candidate for reconfiguration if the PO at least partly overlaps in time with the duration of the SS Burst Set plus a guard time. The guard time condition may be applied from the end of the PO to the start of the first subsequent SS Burst Set or from the end of the closest preceding SS Burst Set to the PO or both. A possible guard time condition could be, for example, one OFDM symbol. Different guard times may exist before and after the PO. The guard time(s) may be configurable in the system information or may be specified in a standard.

Another example is similar to the example above, but the guard time condition is set in relation to the SS Burst Set duration as it would be if all the possible SSB beams are used, as given by the specified maximum number of SSB beams for the carrier frequency band used in the concerned network deployment. If all the allowed SSB beams are used, this condition becomes the same as the one above.

In some embodiments, a PO is a candidate for reconfiguration if at least one of the PDCCH monitoring occasions of the PO at least partly overlaps in time with an SSB transmission.

In another example, a PO is a candidate for reconfiguration if at least one of the PDCCH monitoring occasions of the PO overlaps in time with a slot containing an SSB (i.e., one of the slot(s) of the SS Burst Set).

The following examples that include overlapping or colliding slots may seem to be redundant but are motivated by the fact that the paging PDCCH transmissions may use different SCS and thus different slot duration (albeit the same number of OFDM symbols per slot) than the SSB transmissions.

In some embodiments, a PO is a candidate for reconfiguration if: the at least one of the PDCCH monitoring occasions of the PO is located in the same slot as at least one SSB transmission; at least one of the PDCCH monitoring occasions of the PO is located in a slot that overlaps in time with a slot containing at least one SSB transmission (i.e. one of the slot(s) of the SS Burst Set); or at least one resource element for a PDCCH candidate of at least one PDCCH monitoring occasion overlaps with respective at least one resource element corresponding to an SSB transmission.

In some embodiments, a PO is a candidate for reconfiguration if the PO is located in a radio frame that contains an SS Burst Set. In other words, POs of a PF (wherein the PF contains at least one PO) that is also an SS Burst Set frame (i.e., a radio frame that contains at least one SS Burst Set) fulfill the unsuitability condition. Using this condition (by itself, not combined with any of the other conditions), the cancellation principle operates on PF level rather than on PO level, i.e. entire PFs may be cancelled when coinciding with SS Burst Set frames.

In another example, a PO is a candidate for reconfiguration if at least one PDCCH monitoring occasion of the PO is located in a radio frame which contains an SS Burst Set.

For frequency-multiplexing of SSB transmissions and PDCCH transmissions (for paging), in particular embodiments, the CORESET used for the PDCCH does not overlap with the PRBs used for SSB transmissions. This can be ensured by configuring the CORESET used for the PDCCH for paging and RMSI (e.g., CORESET0/CORESET #0) so that it does not include any of the PRBs used for SSB transmission.

Another option, according to some embodiments, is to configure an additional CORESET for paging for these cases (i.e., cases of frequency-multiplexing of POs and SS Burst Sets for the non-default case), where the additional CORESET neither overlaps with the RMSI CORESET (e.g., CORESET0/CORESET #0) nor with the PRBs used for SSB transmissions. Thus, two CORESETs may be configured for paging PDCCH: one CORESET for PDCCH transmissions that are time-multiplexed (i.e., not frequency-multiplexed) with SSB transmissions (e.g., CORESET0/CORESET #0) and another CORESET for paging PDCCH transmissions that are frequency-multiplexed with SSB transmissions. The second CORESET is thus dedicated for POs that are frequency-multiplexed with SS Burst Sets. Below is an example of how this second CORESET for paging could be included in the ASN.1 specification of the PDCCH-Config-Common information element in TS 38.331 (with the second CORESET for paging denoted controlResourceSetForPagingFrequencyMultiplexedWithSSB):

```
-- ASN1START
-- TAG-PDCCH-CONFIGCOMMON-START
PDCCH-ConfigCommon : :=                SEQUENCE {
   controlResourceSetZero                 ControlResourceSetZero
   OPTIONAL, -- Cond InitialBWP-Only
   commonControlResourceSet               ControlResourceSet   OPTIONAL,
   -- Need R
   controlResourceSetForPagingFrequencyMultiplexedWithSSB
ControlResourceSet   OPTIONAL,
   searchSpaceZero                        SearchSpaceZero      OPTIONAL, -
- Cond InitialBWP-Only
   commonSearchSpaceList                  SEQUENCE (SIZE(1..4)) OF
SearchSpace   OPTIONAL, -- Need R
   searchSpaceSIB1                        SearchSpaceId        OPTIONAL, --
Need S
   searchSpaceOtherSystemInformation      SearchSpaceId
   OPTIONAL, -- Need S
   pagingSearchSpaceSearch                SpaceId              OPTIONAL, --
Need S
   ra-SearchSpaceSearch                   SpaceId              OPTIONAL, --
Need S
   ...
}
-- TAG-PDCCH-CONFIGCOMMON-STOP
-- ASN1STOP
```

Particular embodiments may apply to scenarios other than a one-to-one relation between overlapping POs and SS Burst Sets. For example, additional complexity arises when there is not a one-to-one relation between overlapping POs and SS Burst Sets. As one example, if the SS Burst Set periodicity is configured to 5 ms in a network that uses a large number of beams (e.g., for SSB and paging transmission), such as 64 beams (which is the maximum number of beams for carrier frequencies above 6 GHz), a PO may be configured that overlaps with two consecutive SS Burst Sets. For such cases, ambiguity should be removed regarding which of the two SS Burst Sets to frequency multiplex with the PO. Ambiguity-eliminating rules may include any one or more of the following.

One example rule is that a PO overlapping with two consecutive SS Burst Sets is frequency-multiplexed with the first of the two SS Burst Sets. Another option is that the PO is frequency-multiplexed with the second of the two SS Burst Sets. In some embodiments, a PO overlapping with two consecutive SS Burst Sets is frequency-multiplexed with the one of the two SS Burst Sets with which it has the greatest overlap. If the overlaps are equal with the two SS Burst Sets, then the rule is that the PO is frequency-multiplexed with the first of the two SS Burst Sets, or the rule may be that the PO is frequency-multiplexed with the last of the two SS Burst Sets.

Particular embodiments may use any of the above mechanisms. Which one to use may be standardized or may be configured through indication in the system information.

Another example of a scenario other than a one-to-on relation between overlapping POs and SS Burst Sets is if two POs overlap with the same SS Burst Set. According to the rule of the previously described embodiments, the two POs may both be frequency-multiplexed with the same SS Burst Set. At least three options may be used in this scenario.

In a first option, one of the POs is canceled (i.e., unconfigured) and the UEs allocated to a canceled PO are reallocated to other non-canceled POs. This may be done in accordance with the mechanisms described in more detail below. An additional reallocation alternative may be that the UEs of a canceled PO are reallocated to the other PO that overlaps with the same SS Burst Set and which consequently is frequency-multiplexed with the SS Burst Set (in accordance with the above described embodiments).

Particular embodiments may include a rule that unambiguously determines which of the two POs that should be canceled. For example, the first of the two POs is canceled, or the second of the two POs is canceled. As another example, one of the POs with the smallest overlap with the SS Burst Set is canceled. If both POs have equally large overlaps with the SS Burst Set, the ambiguity may be resolved by canceling the first of the two POs or canceling the second of the two POs. In another example, the one of the POs with the largest overlap with the SS Burst Set is canceled.

In a second option, both POs are frequency-multiplexed with the same SS Burst Set and also frequency-multiplexed with each other. In some embodiments, an additional CORESET is configured, and the paging PDCCH transmissions of the two frequency-multiplexed POs are associated with two different non-overlapping CORESETs (see ASN.1 example below). None of the CORESETs include any of the PRBs used for SSB transmissions.

If there is already a dedicated CORESET configured for POs frequency-multiplexed with SS Burst Sets (as discussed above), then the yet additional CORESET to enable two POs to be frequency-multiplexed with the same SS Burst Set is a third CORESET (see ASN.1 example below) used for paging PDCCH transmissions. However, as discussed above, it is also possible that no dedicated CORESET is configured for POs frequency-multiplexed with SS Burst Sets (i.e., the same CORESET is used as for POs time-multiplexed with SS Burst Sets), and the additional CORE- SET to enable two POs to be frequency-multiplexed with the same SS Burst Set is a second CORESET used for paging PDCCH transmissions.

Irrespective of whether two or three CORESETs are configured for paging PDCCH transmissions, particular embodiments include a rule to determine which of the two POs should be associated with the additional CORESET (that is configured to enable two POs to be frequency-multiplexed with the same SS Burst Set). Options for such an ambiguity-eliminating rule include the following.

The first of the two POs may be associated with the additional CORESET, or the second of the two POs may be associated with the additional CORESET. The one of the POs with the smallest overlap with the SS Burst Set may be associated with the additional CORESET. If both POs have equally large overlaps with the SS Burst Set, the ambiguity may be resolved through associating the first of the two POs with the additional CORESET or associating the second of the two POs with the additional CORESET. As another example, the one of the POs with the largest overlap with the SS Burst Set may be associated with the additional CORESET.

with the smallest overlap with the SS Burst Set may be associated with the additional P-RNTI. If both POs have equally large overlaps with the SS Burst Set, the ambiguity may be resolved through associating the first of the two POs with the additional P-RNTI or associating the second of the two POs with the additional P-RNTI. As another example, the one of the POs that has the largest overlap with the SS Burst Set may be associated with the additional P-RNTI.

Below is an example of how an additional CORESET for paging to be used for a PO that is frequency-multiplexed with another PO and an SS Burst Set could be included in the ASN.1 specification of the PDCCH-ConfigCommon information element in TS 38.331 (with the CORESET for enabling frequency-multiplexing of a PO with a PO denoted controlResourceSetForPagingWithFrequencyMultiplexedPO). One of the two POs that are frequency-multiplexed with an SS Burst Set uses CORESET0/CORESET #0 (i.e., controlResourceSetZero), and the other one uses the CORESET for enabling frequency-multiplexing of a PO with another PO (i.e., controlResourceSetForPagingWithFrequencyMultiplexedPO).

```
-- ASN1START
-- TAG-PDCCH-CONFIGCOMMON-START
PDCCH-ConfigCommon : :=                          SEQUENCE {
    controlResourceSetZero                           ControlResourceSetZero
    OPTIONAL, -- Cond InitialBWP-Only
    commonControlResourceSet                         ControlResourceSet    OPTIONAL,
    -- Need R
    controlResourceSetForPagingWithFrequencyMultiplexedPO
ControlResourceSet   OPTIONAL,
    searchSpaceZero                                  SearchSpaceZero       OPTIONAL, -
- Cond InitialBWP-Only
    commonSearchSpaceList                            SEQUENCE (SIZE(1..4)) OF
SearchSpace  OPTIONAL, -- Need R
    searchSpaceSIB1                                  SearchSpaceId         OPTIONAL, --
Need S
    searchSpaceOtherSystemInformation                SearchSpaceId
    OPTIONAL, -- Need S
    pagingSearchSpace                                SearchSpaceId         OPTIONAL, --
Need S
    ra-SearchSpace                                   SearchSpaceId         OPTIONAL, --
Need S
    ...
}
-- TAG-PDCCH-CONFIGCOMMON-STOP
-- ASN1STOP
```

In a third option, both POs are frequency-multiplexed with the same SS Burst Set and are distinguished from each other through different P-RNTIs. In particular embodiments, an additional P-RNTI, in addition to the regular standardized one, may be configured (e.g., specified in a standard specification, configured in the system information, etc.). One of the two POs that are frequency-multiplexed with the same SS Burst Set is associated with the regular P-RNTI and the other of the two POs is associated with the additional P-RNTI.

Particular embodiments include a rule to determine which of the two POs should be associated with the additional P-RNTI. Options for such an ambiguity-eliminating rule include the following.

The first of the two POs may be associated with the additional P-RNTI, or the second of the two POs may be associated with the additional P-RNTI. The one of the POs Below is another example of how an additional CORESET for paging to be used for a PO which is frequency-multiplexed with another PO and an SS Burst Set could be included in the ASN.1 specification of the PDCCH-ConfigCommon IE in TS 38.331 (with the CORESET for enabling frequency-multiplexing of a PO with a PO denoted controlResourceSetForPagingWithFrequencyMultiplexedPO). One of the two POs that are frequency-multiplexed with an SS Burst Set uses the dedicated (additional) CORESET for POs frequency-multiplexed with SS Burst Sets (i.e., controlResourceSetForPagingFrequencyMultiplexedWithSSB as discussed above), and the other one uses the CORESET for enabling frequency-multiplexing of a PO with another PO (i.e., controlResourceSetForPagingWithFrequencyMultiplexedPO).

```
-- ASN1START
-- TAG-PDCCH-CONFIGCOMMON-START
PDCCH-ConfigCommon : :=              SEQUENCE {
    controlResourceSetZero              ControlResourceSetZero
    OPTIONAL, -- Cond InitialBWP-Only
    commonControlResourceSet            ControlResourceSet    OPTIONAL,
    -- Need R
    controlResourceSetForPagingFrequencyMultiplexedWithSSB
ControlResourceSet   OPTIONAL,
    controlResourceSetForPagingWithFrequencyMultiplexedPO
ControlResourceSet   OPTIONAL,
    searchSpaceZero                     SearchSpaceZero       OPTIONAL, -
- Cond InitialBWP-Only
    commonSearchSpaceList               SEQUENCE (SIZE(1..4)) OF
SearchSpace   OPTIONAL, -- Need R
    searchSpaceSIB1                     SearchSpaceId         OPTIONAL, --
Need S
    searchSpaceOtherSystemInformation        SearchSpaceId
    OPTIONAL, -- Need S
    pagingSearchSpace                   SearchSpaceId         OPTIONAL, --
Need S
    ra-SearchSpace                      SearchSpaceId         OPTIONAL, --
Need S
    ...
}
-- TAG-PDCCH-CONFIGCOMMON-STOP
-- ASN1STOP
```

As referenced above, the following lists potential UE-to-PO reallocation mechanisms. One example of a UE-to-PO reallocation algorithm (i.e., an algorithm that reallocates UEs from canceled POs (to which they were allocated based on the regular UE-to-PO allocation algorithm) includes the following steps.

Step one includes removing the canceled POs from the set of POs configured by the regular PF/PO algorithm (i.e., before the PO cancellation rule is applied), so that a reduced set of P POs remain within a paging DRX cycle. Step two include indexing the remaining P POs within a paging DRX cycle by index i, where i=0, 1, . . . P−1. In some embodiments, P may be as small as 1, resulting in a single remaining PO indexed with i=0.

At step 3, a certain UE is reallocated to the one out of the remaining P POs that satisfies i=UE_ID mod P. The parameter UE_ID may be the same as used in the regular PF/PO algorithm, e.g. IMSI mod 1024 or 5G-S-TMSI mod 1024.

Other examples of possible UE-to-PO reallocation algorithms include the following. Some embodiments include reallocating all UEs originally allocated to a cancelled PO to the first subsequent non-cancelled PO. If no non-cancelled PO exists for the remainder of the paging DRX cycle, the UEs are reallocated to the first non-cancelled PO of the paging DRX cycle.

Some embodiments include reallocating all UEs originally allocated to a cancelled PO to the closest preceding non-cancelled PO. If no non-cancelled PO exists prior to the concerned cancelled PO within the paging DRX cycle, the UEs are reallocated to the last non-cancelled PO of the paging DRX cycle.

Some embodiments may use a hash algorithm to reallocate UEs from cancelled POs to other (non-cancelled) POs, e.g. based on an identifier associated with each UE, such as the UE_ID parameter used in the regular PF/PO algorithm and UE-to-PO allocation algorithm. For example, by applying the hash algorithm on the UE identifier, the algorithm outputs the index i of one of the non-cancelled POs, where the non-cancelled POs in a paging DRX cycle are indexed by i (where i=0, 1, . . . P−1).

Some embodiments may standardize multiple options and let each network operator choose which one to apply and indicate this in the system information.

While particular examples and embodiments are described with respect to paging occasions and SSBs, particular embodiments may apply to multiplexing other control channel monitoring occasions. In general, a "control channel occasion" refers to a set of "monitoring occasions" or "control channel monitoring occasions." The general term "control channel occasion" may thus refer to "paging occasion" as one example, or an occasion in/during which another control channel may be transmitted. Although particular embodiments are described using the term "paging occasion", this should not be seen as limiting and the particular embodiments apply to other cases where the control channel to be monitored is a control channel other than paging.

Figure 4:
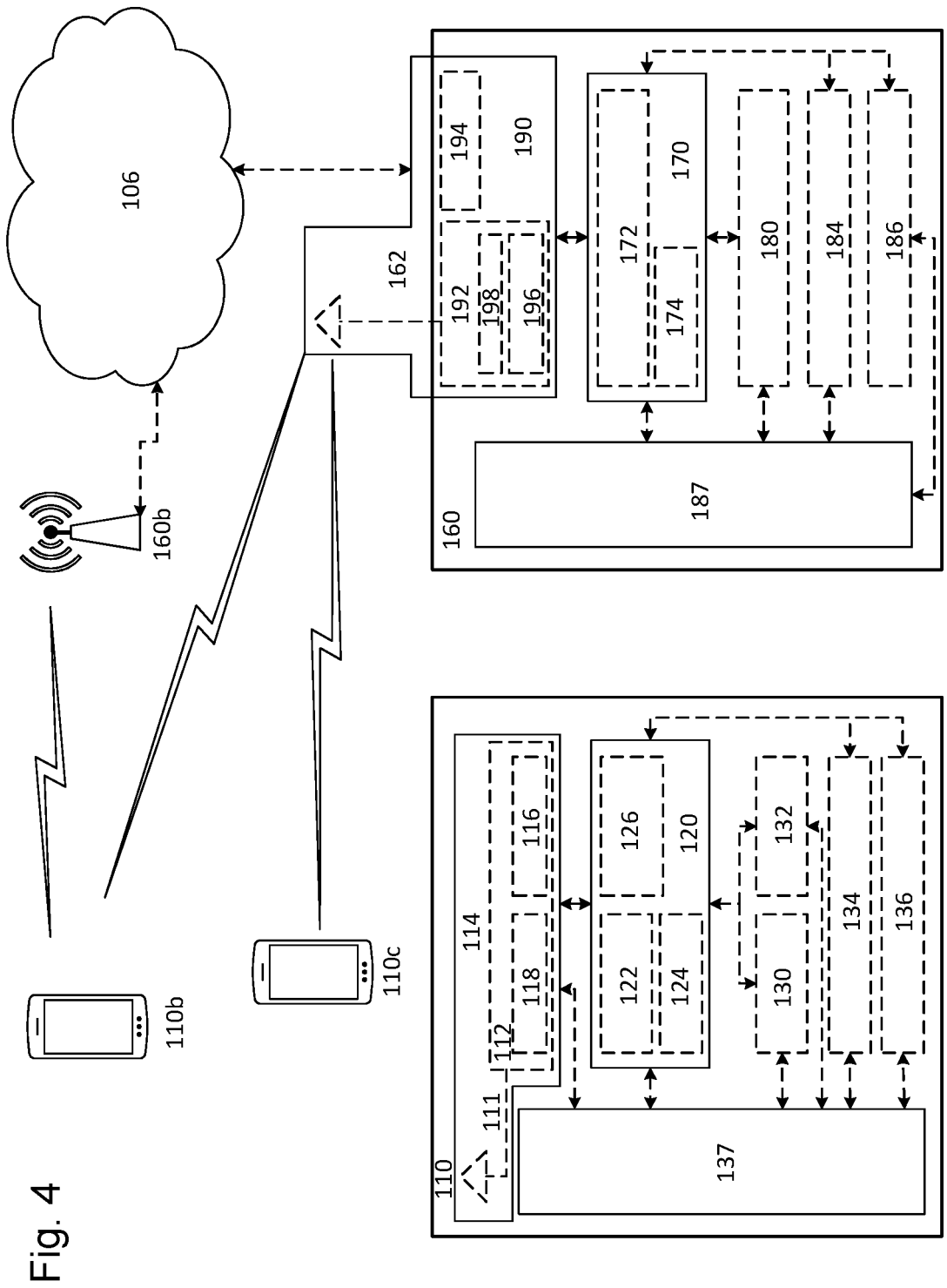
FIG. 4 is a block diagram illustrating an example wireless network.

FIG. 4 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 160 includes processing circuitry 170, device readable medium 180, interface 190, auxiliary equipment 184, power source 186, power circuitry 187, and antenna 162. Although network node 160 illustrated in the example wireless network of FIG. 4 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 4 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 5:
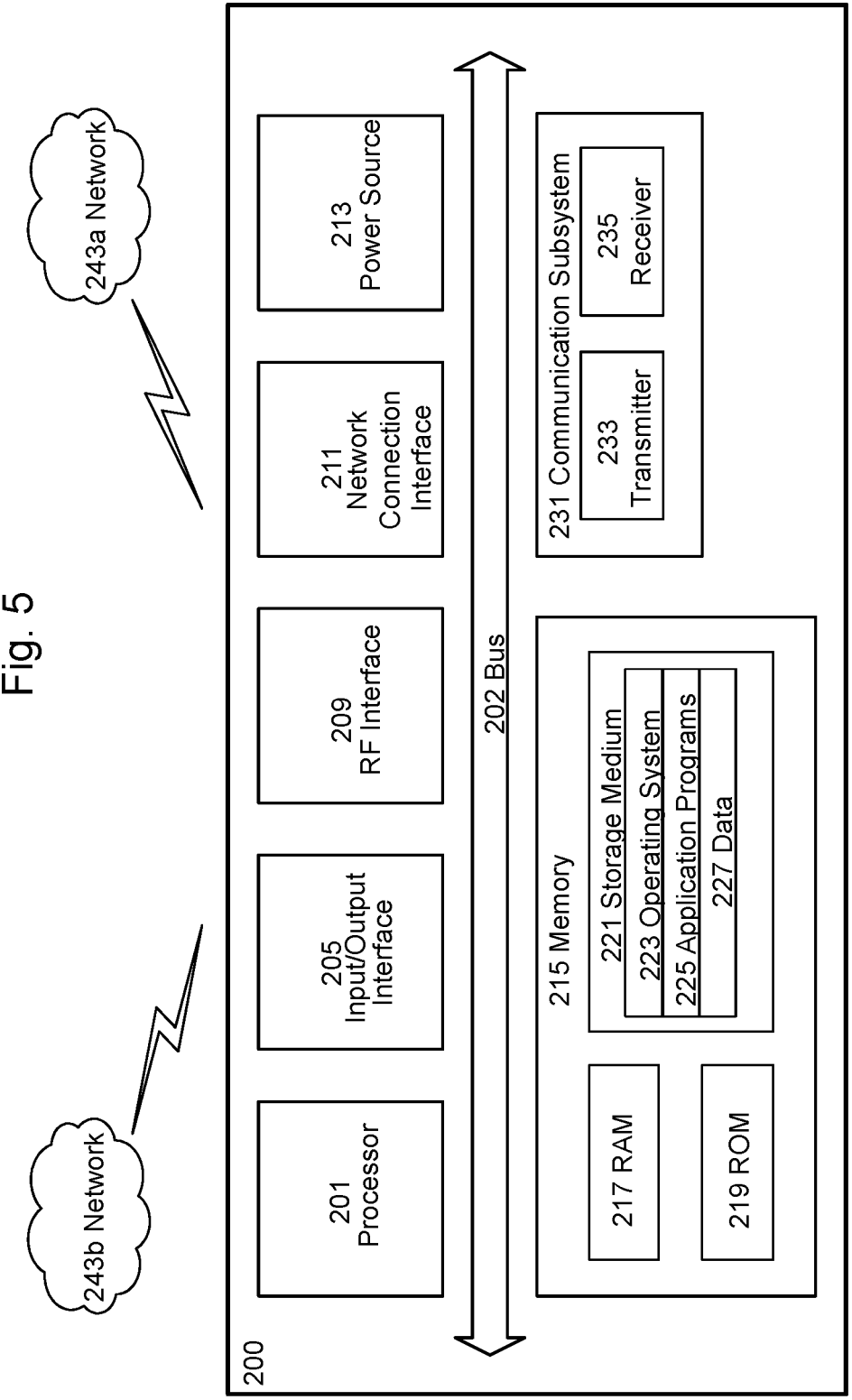
FIG. 5 illustrates an example user equipment, according to certain embodiments.

FIG. 5 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 5, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may use all the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 5, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 6:
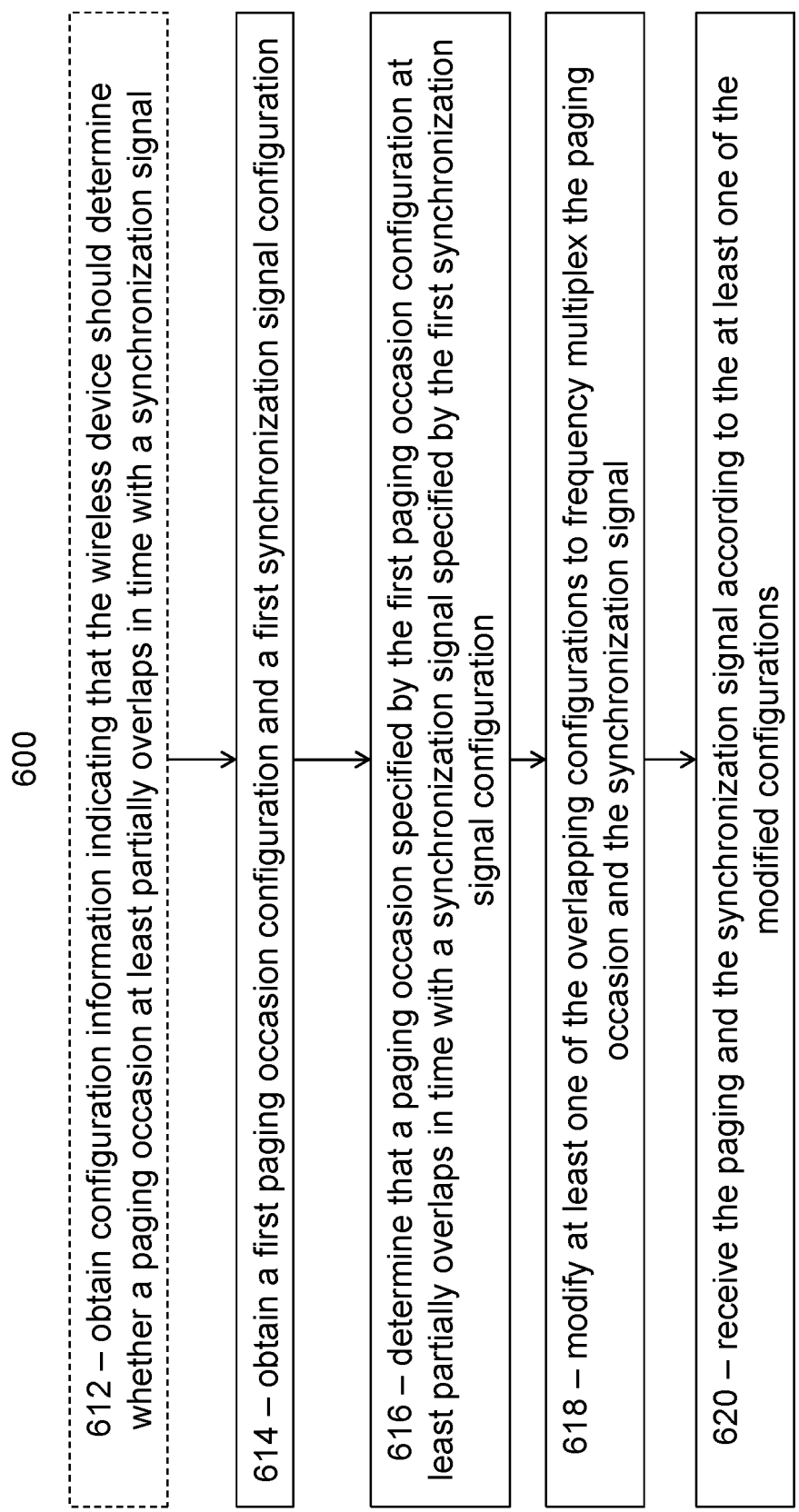
FIG. 6 is flowchart illustrating an example method in a wireless device, according to certain embodiments.

FIG. 6 is a flowchart illustrating an example method in a user equipment, according to certain embodiments. In particular embodiments, one or more steps of FIG. 6 may be performed by wireless device 110 described with respect to FIG. 4.

The method may begin at step 612, where the wireless device (e.g., wireless device 110) may obtain configuration information indicating that the wireless device should determine whether a paging occasion at least partially overlaps in time with a synchronization signal. For example, some wireless devices may be agnostic as to whether a paging occasion overlaps with a synchronization signal. Other wireless devices, such as those described herein, may be configured to compare a paging occasion configuration and a synchronization signal configuration to determine overlap. The wireless device may be pre-configured based on a standard specification, network operator preference, or any other suitable configuration. The wireless device may obtain the configuration from a network node.

In some embodiments, the obtained configuration information may indicate a frequency multiplexing pattern to use when the wireless device determines that a paging occasion at least partially overlaps in time with a synchronization signal. The pattern may include one of 3GPP 5G NR CORESET-SSB multiplexing patterns 2 or 3, or any other suitable frequency multiplexing pattern.

The wireless device and its serving network node should share the same configuration so that the wireless device knows what transmissions to expect from the network node. For example, if the network node is configured to transmit according to multiplexing pattern 2, then the wireless device should be configured to receive according to multiplexing pattern 2.

At step 614, the wireless device obtains a first paging occasion configuration and a first synchronization signal configuration. The wireless device may obtain the configuration according to any of the examples and embodiments described above (e.g., via signalling of a paging search space, via calculations based on frame numbers, via standard specification, etc., or any suitable combination).

At step 616, the wireless device determines that a paging occasion specified by the first paging occasion configuration at least partially overlaps in time with a synchronization signal specified by the first synchronization signal configuration. For example, the paging occasion configuration includes a pattern of one or more paging occasions and may also include a pattern of monitoring occasions within each paging occasion. Similarly, the synchronization signal configuration includes a pattern of one or more SS Burst Sets and a pattern of SS Block (SSB) transmissions (each occupying 4 OFDM symbols) within each SS Burst Set. One or more of the paging occasions may overlap with one or more SS Bursts. The wireless device determines any overlap according to any of the embodiments and examples described above.

As some examples, the wireless device may determine that the paging occasion at least partially overlaps in time with the synchronization signal (e.g., duration of a SS Burst Set) if a network node uses all synchronization signal beams specified by the 3GPP 5G NR standard specification for the carrier frequency band. In some embodiments it may comprise determining that the paging occasion at least partially overlaps in time with the synchronization signal (e.g., SS Burst Set) plus a guard time or that the paging occasion occurs in the same slot as at least part of the synchronization signal (e.g., at least one SSB transmission of the SS Burst Set). In some embodiments it may comprise determining that at least part of the paging occasion is located in the same radio frame, or half frame, as the synchronization signal (e.g., SS Burst Set).

In some embodiments the paging occasion comprises a plurality of monitoring occasions and determining that the paging occasion at least partially overlaps in time with the synchronization signal (e.g., SS Burst Set) comprises determining that at least one monitoring occasion of the plurality of monitoring occasions at least partly overlaps in time with the synchronization signal (e.g., SS Burst Set). In some embodiments, the paging occasion comprises a plurality of monitoring occasions and the synchronization signal (e.g., SS Burst Set) comprises a plurality of synchronization sequence transmissions, and determining that the paging occasion at least partially overlaps in time with the synchronization signal (e.g., SS Burst Set) comprises determining that at least one monitoring occasion of the plurality of monitoring occasions at least partly overlaps in time with at least one of the synchronization sequence transmissions.

At step 618, the wireless device modifies at least one of the paging occasion configuration for the at least partially overlapping paging occasion and the synchronization signal configuration for the at least partially overlapping synchronization signal to frequency multiplex the paging occasion and the synchronization signal. For example, for an overlapping paging occasion the wireless device may modify the configuration for that particular instance to be frequency multiplexed with the synchronization signal.

Frequency multiplexing the overlapping paging occasion and the synchronization signal is advantageous, for example, when the network node uses analog transmit beamforming and can only transmit in one beam direction at a time. Transmitting paging transmissions frequency-multiplexed with SSBs efficiently uses the downlink transmission resources (which otherwise risk being wasted). From the perspective of the wireless device, frequency-multiplexing of SSBs and paging transmissions (e.g., PDCCH transmissions (and/or PDSCH transmissions)) enables the device to receive the SSB (e.g., to acquire/tune downlink synchronization) and the paging transmission simultaneously, thus facilitating shorter wake time for the wireless device than if the SSB and the paging transmission have to be received separately (i.e., separated in time).

In some embodiments, the wireless device may only modify the paging occasion configuration for the overlapping occasion. In some embodiments, the wireless device may only modify the synchronization signal configuration for the overlapping occasion. In some embodiments, the wireless device may modify both.

At step 620, the wireless device receives the paging occasion and the synchronization signal according to the at least one of the modified paging occasion configuration and modified synchronization signal configuration. For example, the wireless device receives the synchronization signaling and the monitors the paging occasion simultaneously based on the frequency multiplexed configuration.

Modifications, additions, or omissions may be made to method 600 of FIG. 6. Additionally, one or more steps in the method of FIG. 6 may be performed in parallel or in any suitable order.

Figure 7:
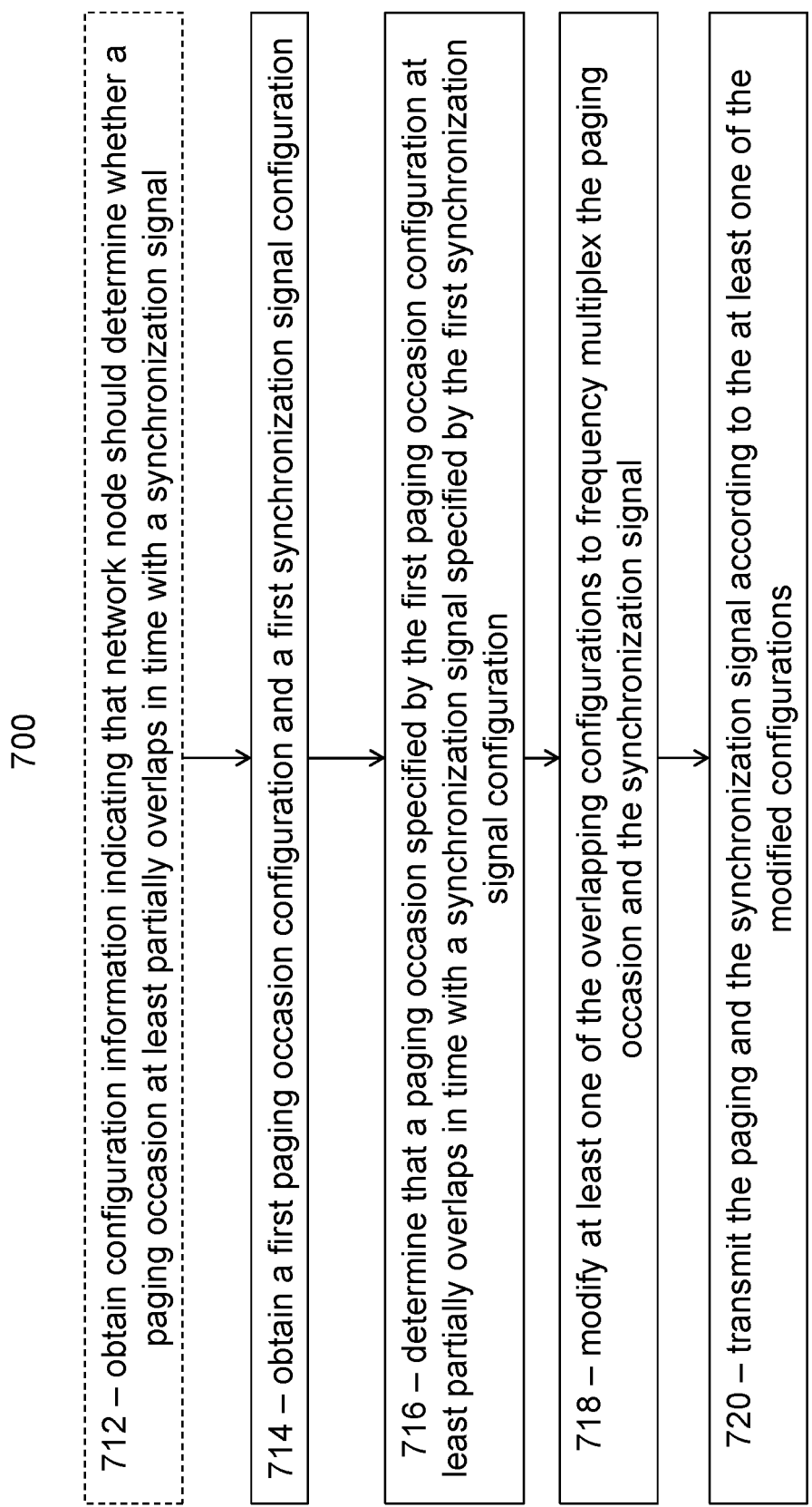
FIG. 7 is a flowchart illustrating an example method in a network node, according to certain embodiments.

FIG. 7 is a flowchart illustrating an example method in a network node, according to certain embodiments. In particular embodiments, one or more steps of FIG. 7 may be performed by network node 160 described with respect to FIG. 4.

The method may begin at step 712, where the network node (e.g., network node 160) may obtain configuration information indicating that the network node should determine whether a paging occasion at least partially overlaps in time with a synchronization signal. For example, some network nodes may be agnostic as to whether a paging occasion overlaps with a synchronization signal. Other network nodes, such as those described herein, may be configured to compare a paging occasion configuration and a synchronization signal configuration to determine overlap. The network node may be pre-configured based on a standard specification, network operator preference, or any other suitable configuration. The wireless device may obtain the configuration from another network node.

In some embodiments, the obtained configuration information may indicate a frequency multiplexing pattern to use when the network node determines that a paging occasion at least partially overlaps in time with a synchronization signal. The pattern may include one of 3GPP 5G NR CORESET-SSB multiplexing patterns 2 or 3, or any other suitable frequency multiplexing pattern.

A wireless device and its serving network node should share the same configuration so that the wireless device knows what transmissions to expect from the network node. For example, if the network node is configured to transmit according to multiplexing pattern 2, then the wireless device should be configured to receive according to multiplexing pattern 2.

At step 714, the network node obtains a first paging occasion configuration and a first synchronization signal configuration. The network node may obtain the configuration according to any of the examples and embodiments described above (e.g., via signalling of a paging search space, via calculations based on frame numbers, via standard specification, etc., or any suitable combination).

At step 716, the network node determines that a paging occasion specified by the first paging occasion configuration at least partially overlaps in time with a synchronization signal specified by the first synchronization signal configuration. For example, the paging occasion configuration includes a pattern of one or more paging occasions and may also include a pattern of monitoring occasions within each paging occasion. Similarly, the synchronization signal configuration includes a pattern of one or more SS Burst Sets and a pattern of SS Block (SSB) transmissions (each occupying 4 OFDM symbols) within each SS Burst Set. One of more of the paging occasions may overlap in time with one or more SS Bursts. The network node determines any overlap according to any of the embodiments and examples described above.

As some examples, the network node may determine that the paging occasion at least partially overlaps in time with the synchronization signal (e.g., SS Burst Set) if a network node uses all synchronization signal beams specified by the 3GPP 5G NR standard specification for the carrier frequency band. In some embodiments it may comprise determining that the paging occasion at least partially overlaps in time with the synchronization signal (e.g., SS Burst Set) plus a guard time or that the paging occasion occurs in the same slot as at least part of the synchronization signal (e.g., at least one SSB transmission of the SS Burst Set). In some embodiments it may comprise determining that at least part of the paging occasion is located in the same radio frame, or half frame, as the synchronization signal (e.g., SS Burst Set).

In some embodiments the paging occasion comprises a plurality of monitoring occasions and determining that the paging occasion at least partially overlaps in time with the synchronization signal (e.g., SS Burst Set) comprises determining that at least one monitoring occasion of the plurality of monitoring occasions at least partly overlaps in time with the synchronization signal (e.g., SS Burst Set). In some embodiments, the paging occasion comprises a plurality of monitoring occasions and the synchronization signal (e.g., SS Burst Set) comprises a plurality of synchronization sequence transmissions, and determining that the paging occasion at least partially overlaps in time with the synchronization signal (e.g., SS Burst Set) comprises determining that at least one monitoring occasion of the plurality of monitoring occasions at least partly overlaps in time with at least one of the synchronization sequence transmissions.

At step 718, the network node modifies at least one of the paging occasion configuration for the at least partially overlapping paging occasion and the synchronization signal configuration for the at least partially overlapping synchronization signal to frequency multiplex the paging occasion and the synchronization signal. For example, for an overlapping paging occasion the network node may modify the configuration for that particular instance to be frequency multiplexed with the synchronization signal.

Frequency multiplexing the overlapping paging occasion and the synchronization signal is advantageous, for example, when the network node uses analog transmit beamforming and can only transmit in one beam direction at a time. Transmitting paging transmissions frequency-multiplexed with SSBs efficiently uses the downlink transmission resources (which otherwise risk being wasted). From the perspective of the wireless device, frequency-multiplexing of SSBs and paging transmissions (e.g., PDCCH transmissions (and/or PDSCH transmissions)) enables the device to receive the SSB (e.g., to acquire/tune downlink synchronization) and the paging transmission simultaneously, thus facilitating shorter wake time for the wireless device than if the SSB and the paging transmission have to be received separately (i.e., separated in time).

In some embodiments, the network node may only modify the paging occasion configuration for the overlapping occasion. In some embodiments, the network node may only modify the synchronization signal configuration for the overlapping occasion. In some embodiments, the network node may modify both.

At step 620, the network node transmits the paging occasion and the synchronization signal according to the at least one of the modified paging occasion configuration and modified synchronization signal configuration. For example, the network node transmits the synchronization signaling and any paging information simultaneously based on the frequency multiplexed configuration.

Modifications, additions, or omissions may be made to method 700 of FIG. 7. Additionally, one or more steps in the method of FIG. 7 may be performed in parallel or in any suitable order.

Figure 8:
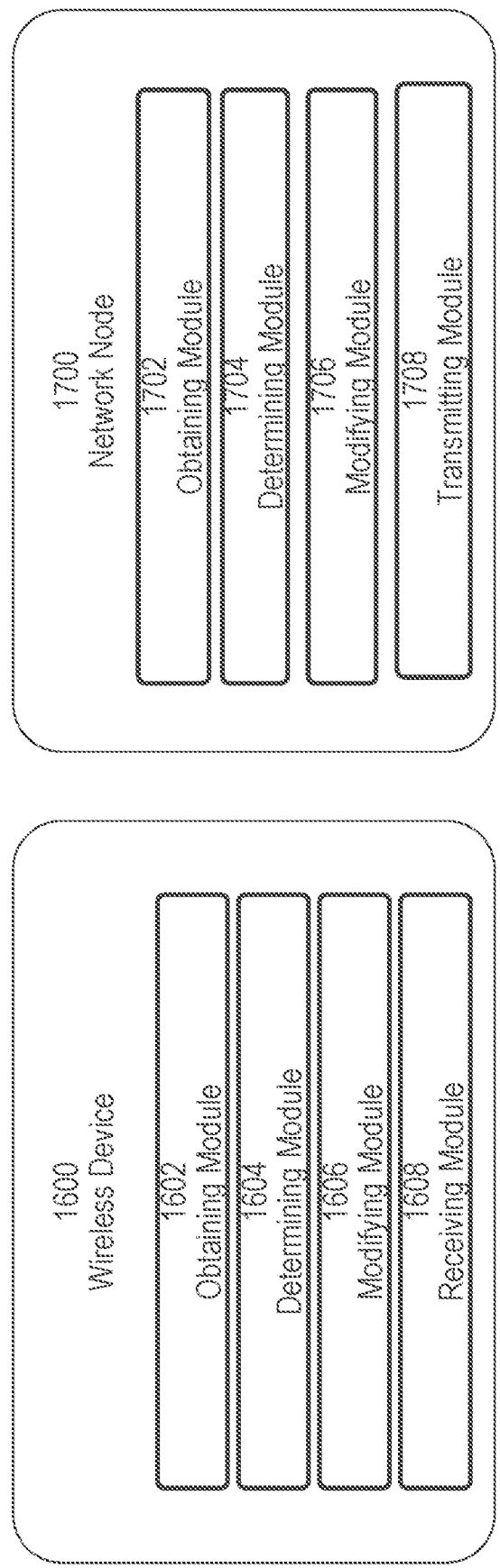
FIG. 8 illustrates a schematic block diagram of a wireless device and network node in a wireless network, according to certain embodiments.

FIG. 8 illustrates a schematic block diagram of two apparatuses in a wireless network (for example, the wireless network illustrated in FIG. 4). The apparatuses include a wireless device and a network node (e.g., wireless device 110 and network node 160 illustrated in FIG. 4). Apparatuses 1600 and 1700 are operable to carry out the example methods described with reference to FIGS. 6 and 7, respectively, and possibly any other processes or methods disclosed herein. It is also to be understood that the methods of FIGS. 6 and 7 are not necessarily carried out solely by apparatus 1600 and/or apparatus 1700. At least some operations of the method can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause obtaining module 1602, determining module 1604, modifying module 1606, receiving module 1608, and any other suitable units of apparatus 1600 to perform corresponding functions according one or more embodiments of the present disclosure. Similarly, the processing circuitry described above may be used to cause obtaining module 1702, determining module 1704, modifying module 1706, transmitting module 1708, and any other suitable units of apparatus 1700 to perform corresponding functions according one or more embodiments of the present disclosure.

As illustrated in FIG. 8, apparatus 1600 includes obtaining module 1602 configured to receive paging and synchronization configuration information, according to any of the embodiments and examples described herein. Apparatus 1600 also includes determining module 1604 configured to determine whether a paging occasion and a synchronization signal overlap in time, according to any of the embodiments and examples described herein. Modifying module 1606 is configured to modify paging and/or synchronization configuration information to frequency multiplex a paging occasion and a synchronization signal, according to any of the embodiments and examples described herein. Receiving module 1608 is configured to receive a paging occasion and a synchronization signal according to the modified paging occasion configuration and/or modified synchronization signal configuration.

As illustrated in FIG. 8, apparatus 1700 includes obtaining module 1702 configured to receive paging and synchronization configuration information, according to any of the embodiments and examples described herein. Apparatus 1700 also includes determining module 1704 configured to determine whether a paging occasion and a synchronization signal overlap in time, according to any of the embodiments and examples described herein. Modifying module 1706 is configured to modify paging and/or synchronization configuration information to frequency multiplex a paging occasion and a synchronization signal, according to any of the embodiments and examples described herein. Transmitting module 1708 is configured to transmit paging information and a synchronization signal according to the modified paging occasion configuration and/or modified synchronization signal configuration.

Figure 9:
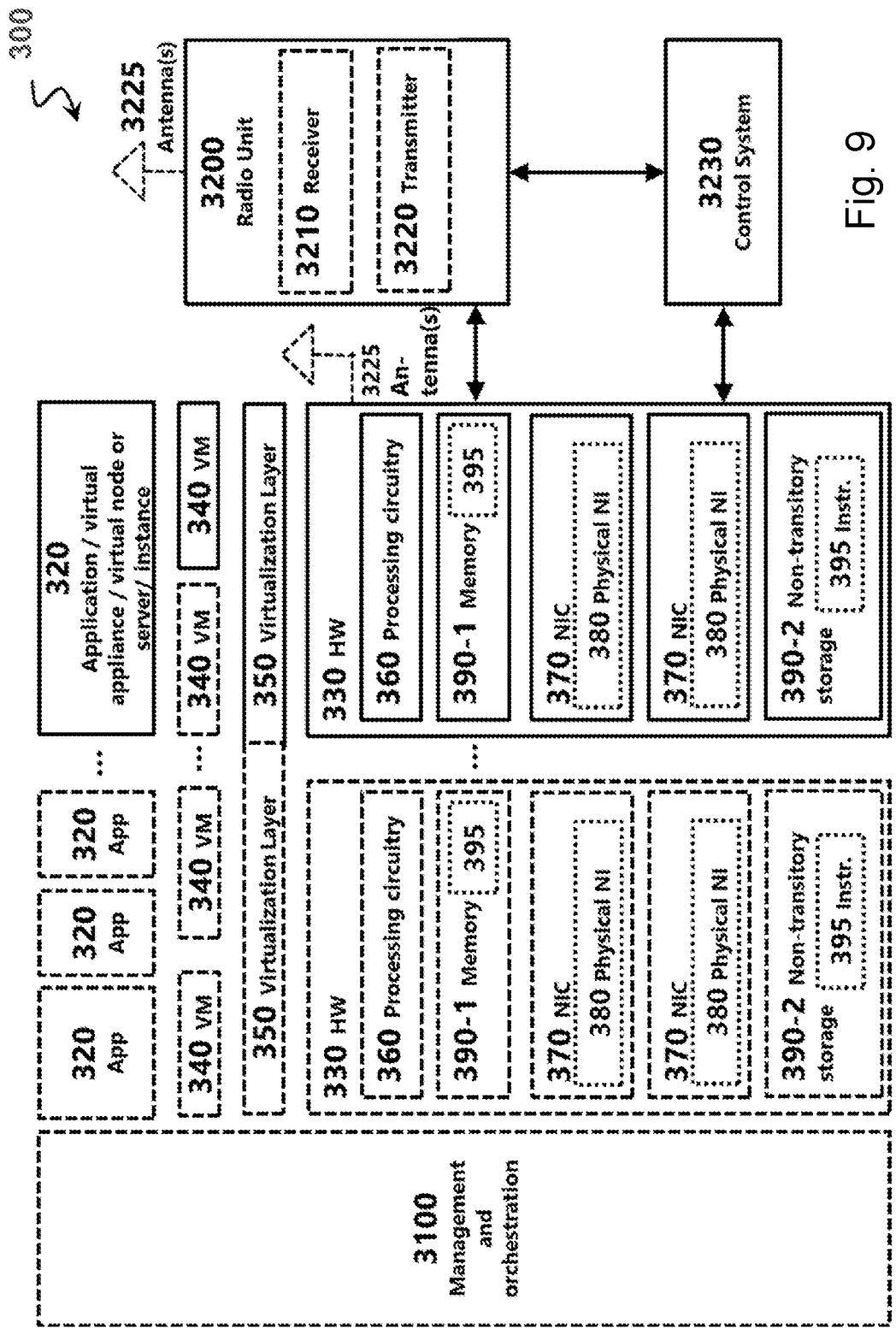
FIG. 9 illustrates an example virtualization environment, according to certain embodiments.

FIG. 9 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 9, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 10:
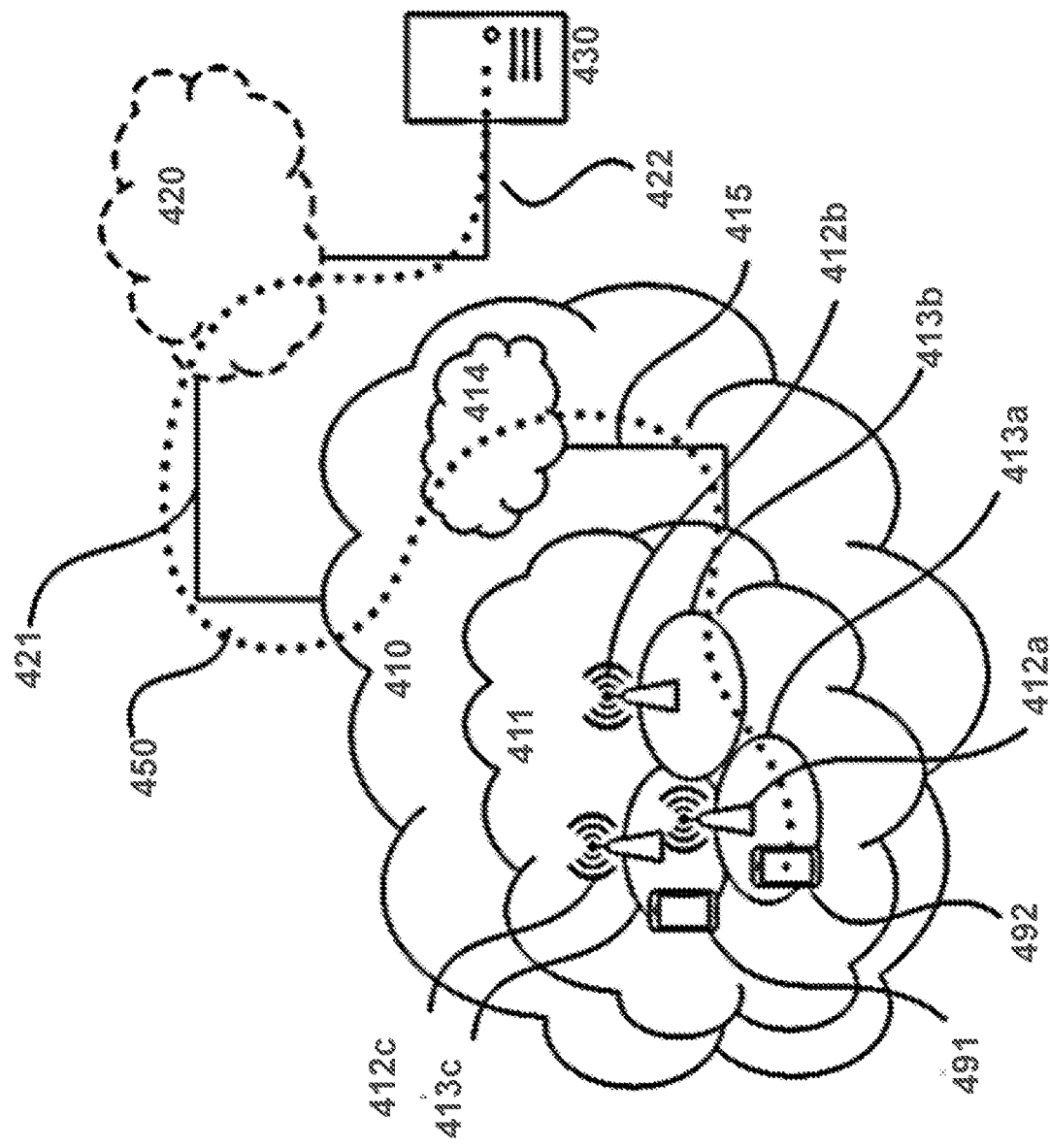
FIG. 10 illustrates an example telecommunication network connected via an intermediate network to a host computer, according to certain embodiments.

With reference to FIG. 10, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 11:
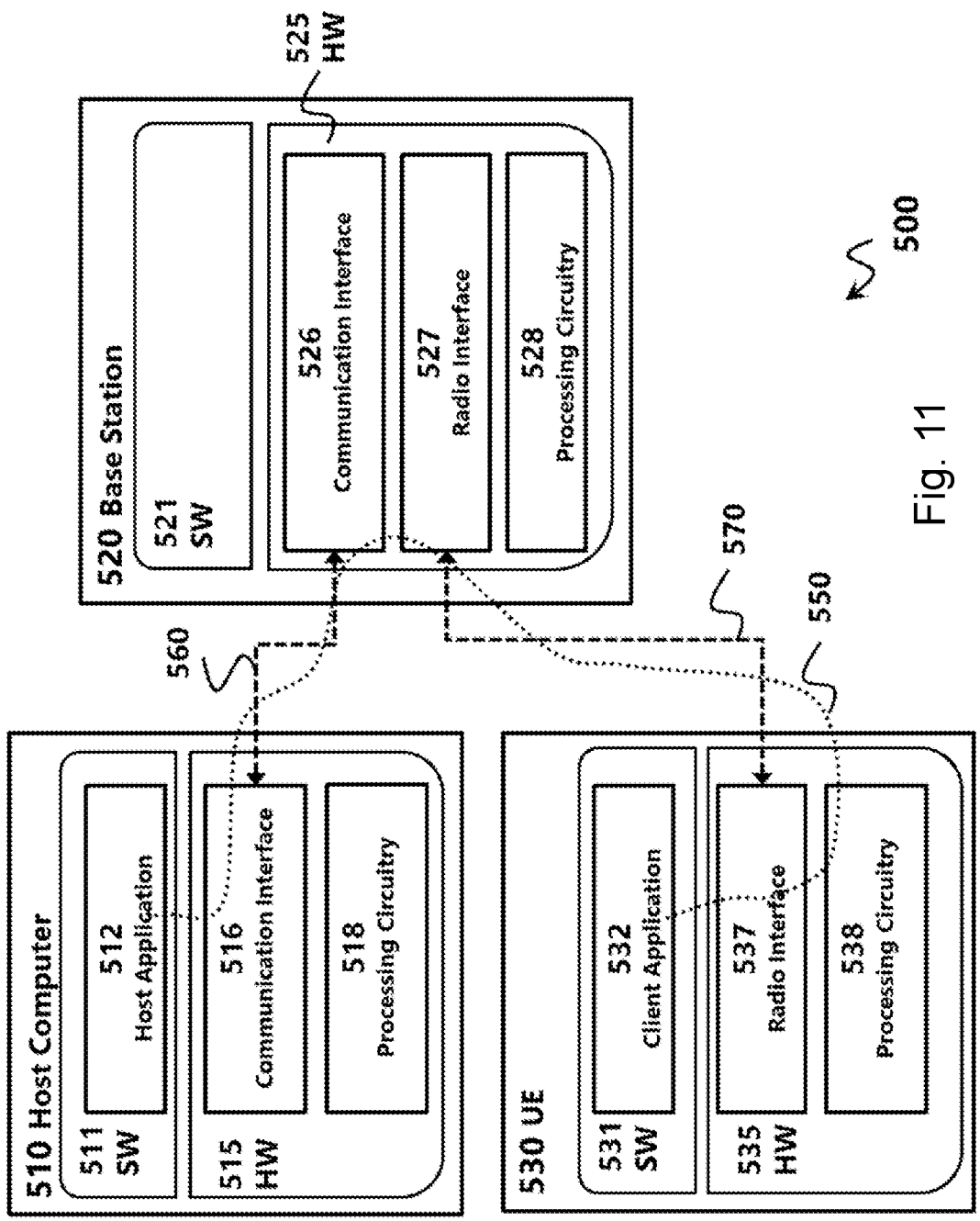
FIG. 11 illustrates an example host computer communicating via a base station with a user equipment over a partially wireless connection, according to certain embodiments.

FIG. 11 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by base station 520. Communication interface 526 may be configured to facilitate connection 560 to host computer 510. Connection 560 may be direct, or it may pass through a core network (not shown in FIG. 11) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 11 may be similar or identical to host computer 430, one of base stations 412a, 412b, 412c and one of UEs 491, 492 of FIG. 4, respectively. This is to say, the inner workings of these entities may be as shown in FIG. 11 and independently, the surrounding network topology may be that of FIG. 4.

In FIG. 11, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, and thereby provide benefits such as reduced user waiting time, better responsiveness and extended battery life.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 15:
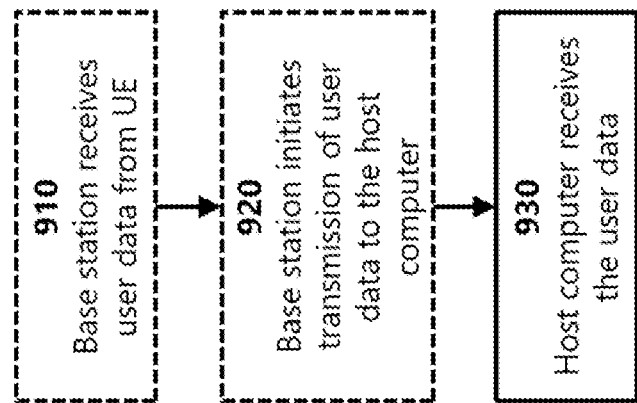
FIG. 15 is a flowchart illustrating a method implemented in a communication system, according to certain embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 13:
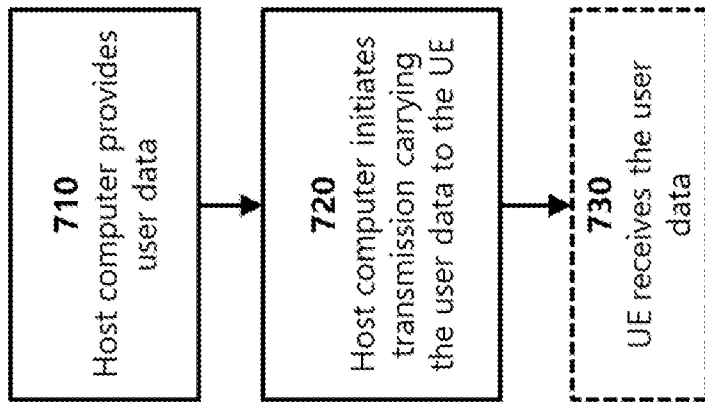
FIG. 13 is a flowchart illustrating a method implemented in a communication system, according to certain embodiments.
Figure 12:
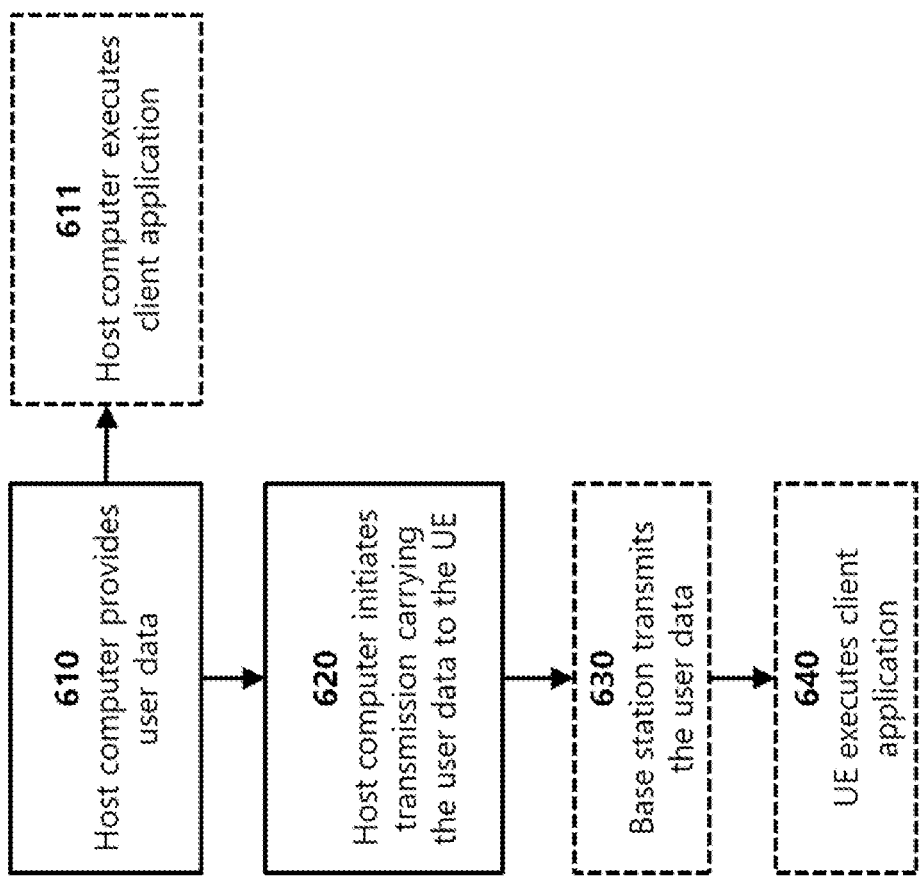
FIG. 12 is a flowchart illustrating a method implemented, according to certain embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 14:
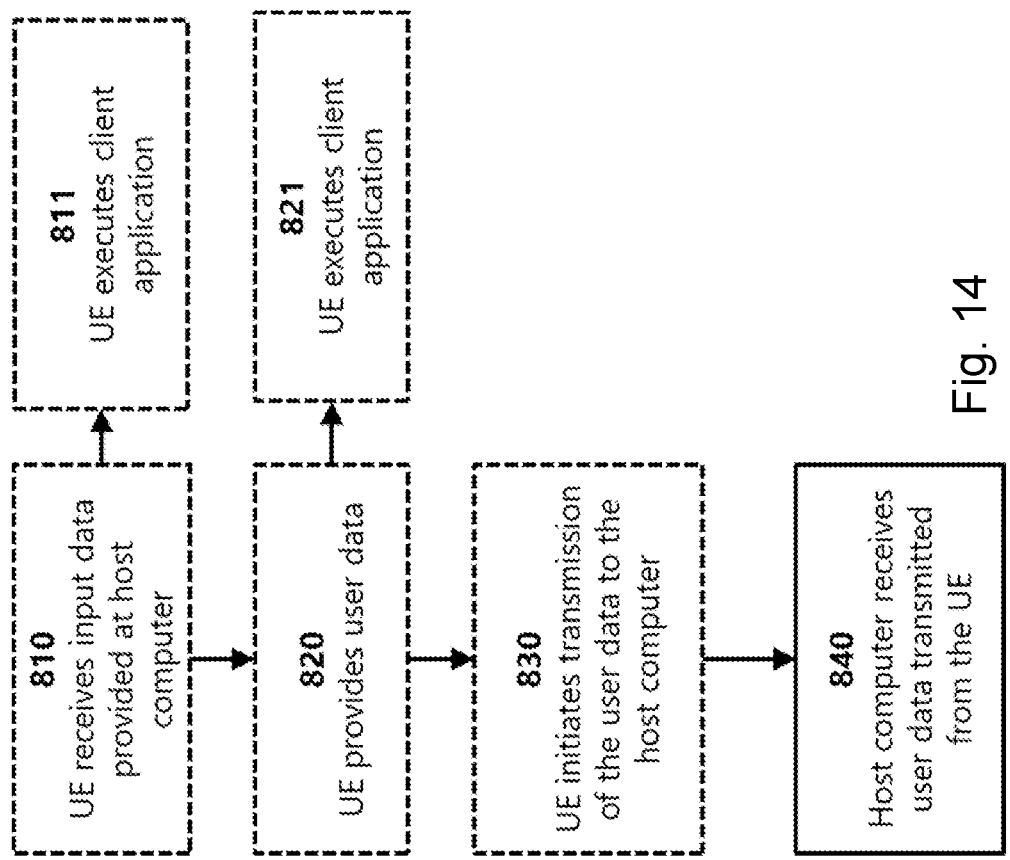
FIG. 14 is a flowchart illustrating a method implemented in a communication system, according to certain embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
5GC 5th Generation Core
5G-S-TMSI temporary identifier used in NR as a replacement of the S-TMSI in LTE
ABS Almost Blank Subframe
ARQ Automatic Repeat Request
ASN.1 Abstract Syntax Notation One
AWGN Additive White Gaussian Noise
BCCH Broadcast Control Channel
BCH Broadcast Channel
BWP Bandwidth Part
CA Carrier Aggregation
CC Carrier Component
CCCH SDU Common Control Channel SDU
CDMA Code Division Multiplexing Access
CGI Cell Global Identifier
CIR Channel Impulse Response
CMAS Commercial Mobile Alert System
CN Core Network
CORESET Control Resource Set
CP Cyclic Prefix
CPICH Common Pilot Channel
CPICH Ec/No CPICH Received energy per chip divided by the power density in the band
CRC Cyclic Redundancy Check
CQI Channel Quality information
C-RNTI Cell RNTI
CSI Channel State Information
DCCH Dedicated Control Channel
DCI Downlink Control Information
div Notation indicating integer division.
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
EPS Evolved Packet System
E-SMLC evolved Serving Mobile Location Center
E-UTRA Evolved UTRA
E-UTRAN Evolved UTRAN
ETWS Earthquake and Tsunami Warning System
FDD Frequency Division Duplex
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
ID Identity/Identifier
IMSI International Mobile Subscriber Identity
I-RNTI Inactive Radio Network Temporary Identifier
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
mod modulo
ms millisecond
MSC Mobile Switching Center
MSI Minimum System Information
NPDCCH Narrowband Physical Downlink Control Channel
NAS Non-Access Stratum
NGC Next Generation Core
NG-RAN Next Generation RAN
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PF Paging Frame
PGW Packet Gateway
PHICH Physical Hybrid-ARQ Indicator Channel
PLMN Public Land Mobile Network
PMI Precoder Matrix Indicator
PO Paging Occasion
PRACH Physical Random Access Channel
PRB Physical Resource Block
P-RNTI Paging RNTI
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RMSI Remaining Minimum System Information
RNA RAN Notification Area
RNC Radio Network Controller RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SAE System Architecture Evolution
SCH Synchronization Channel
SCell Secondary Cell
SDU Service Data Unit
SFN System Frame Number
SGW Serving Gateway
SI System Information
SIB System Information Block
SIB1 System Information Block type 1
SNR Signal to Noise Ratio
SON Self Optimized Network
SS Synchronization Signal
SSS Secondary Synchronization Signal
S-TMSI SAE-TMSI
TDD Time Division Duplex
TMSI Temporary Mobile Subscriber Identity
TDOA Time Difference of Arrival
TOA Time of Arrival
TSS Tertiary Synchronization Signal
TS Technical Specification
TSG Technical Specification Group
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WG Working Group
WLAN Wide Local Area Network

The invention claimed is:

1. A method performed by a wireless device of receiving paging occasions and synchronization signals in a carrier frequency band, the method comprising:
obtaining a first paging occasion configuration and a first synchronization signal configuration;
determining that a paging occasion specified by the first paging occasion configuration at least partially overlaps in time with a synchronization signal specified by the first synchronization signal configuration;
modifying at least one of
the paging occasion configuration for the at least partially overlapping paging occasion, and
the synchronization signal configuration for the at least partially overlapping synchronization signal
to frequency multiplex the paging occasion and the synchronization signal, wherein modifying the at least one the paging occasion configuration and the synchronization signal configuration comprises modifying a page search space configuration associated with the paging occasion by replacing a Physical Downlink Control Channel (PDCCH) monitoring configuration associated with the paging occasion with a pattern of the frequency-multiplexed paging occasion and the synchronization signal; and
receiving the paging occasion and the synchronization signal in the carrier frequency band according to the at least one of the modified paging occasion configuration and modified synchronization signal configuration.

2. A wireless device capable of receiving paging occasions and synchronization signals in a carrier frequency band, the wireless device comprising processing circuitry operable to:
obtain a first paging occasion configuration and a first synchronization signal configuration;
determine that a paging occasion specified by the first paging occasion configuration at least partially overlaps in time with a synchronization signal specified by the first synchronization signal configuration;
modify at least one of
the paging occasion configuration for the at least partially overlapping paging occasion, and
the synchronization signal configuration for the at least partially overlapping synchronization signal
to frequency multiplex the paging occasion and the synchronization signal, wherein modifying the at least one the paging occasion configuration and the synchronization signal configuration comprises modifying a page search space configuration associated with the paging occasion by replacing a Physical Downlink Control Channel (PDCCH) monitoring configuration associated with the paging occasion with a pattern of the frequency-multiplexed paging occasion and the synchronization signal; and
receive the paging occasion and the synchronization signal in the carrier frequency band according to the at least one of the modified paging occasion configuration and modified synchronization signal configuration.

3. The wireless device of claim 2, the processing circuitry further operable to obtain configuration information indicating that the wireless device should determine whether a paging occasion at least partially overlaps in time with a synchronization signal.

4. The wireless device of claim 3, wherein the obtained configuration information further indicates a frequency multiplexing pattern to use when the wireless device determines that a paging occasion at least partially overlaps in time with a synchronization signal.

5. The wireless device of claim 2, wherein the processing circuitry is operable to modify at least one of the paging occasion configuration and the synchronization signal configuration by modifying at least one of the paging occasion configuration and the synchronization signal configuration according to Third Generation Partnership Project (3GPP) fifth generation (5G) new radio (NR) CORESET-SSB multiplexing patterns 2 or 3.

6. The wireless device of claim 2, wherein the processing circuitry is operable to determine that the paging occasion at least partially overlaps in time with the synchronization signal by determining that the paging occasion at least partially overlaps in time with the synchronization signal if a network node uses all synchronization signal beams specified by the Third Generation Partnership Project (3GPP) fifth generation (5G) new radio (NR) standard specification for the carrier frequency band.

7. The wireless device of claim 2, wherein the processing circuitry is operable to determine that the paging occasion at least partially overlaps in time with the synchronization signal by determining that the paging occasion at least partially overlaps in time with the synchronization signal plus a guard time.

8. The wireless device of claim 2, wherein the processing circuitry is operable to determine that the paging occasion at least partially overlaps in time with the synchronization signal by determining that the paging occasion occurs in the same slot as the synchronization signal.

9. The wireless device of claim 2, wherein the processing circuitry is operable to determine that the paging occasion at least partially overlaps in time with the synchronization signal by determining that at least part of the paging occasion is located in the same radio frame as the synchronization signal.

10. The wireless device of claim 2, wherein the processing circuitry is operable to determine that the paging occasion at least partially overlaps in time with the synchronization signal by determining that at least part of the paging occasion is located in the same radio half frame as the synchronization signal.

11. The wireless device of claim 2, wherein the paging occasion comprises a plurality of monitoring occasions and the processing circuitry is operable to determine that the paging occasion at least partially overlaps in time with the synchronization signal by determining that at least one monitoring occasion of the plurality of monitoring occasions at least partly overlaps in time with the synchronization signal.

12. A method performed by a network node of transmitting paging occasions and synchronization signals in a carrier frequency band, the method comprising:
obtaining a first paging occasion configuration and a first synchronization signal configuration;
determining that a paging occasion specified by the first paging occasion configuration at least partially overlaps in time with a synchronization signal specified by the first synchronization signal configuration;
modifying at least one of
the paging occasion configuration for the at least partially overlapping paging occasion, and
the synchronization signal configuration for the at least partially overlapping synchronization signal
to frequency multiplex the paging occasion and the synchronization signal, wherein modifying the at least one the paging occasion configuration and the synchronization signal configuration comprises modifying a page search space configuration associated with the paging occasion by replacing a Physical Downlink Control Channel (PDCCH) monitoring configuration associated with the paging occasion with a pattern of the frequency-multiplexed paging occasion and the synchronization signal; and
transmitting the paging occasion and the synchronization signal in the carrier frequency band according to the at least one of the modified paging occasion configuration and modified synchronization signal configuration.

13. A network node capable of receiving paging occasions and synchronization signals in a carrier frequency band, the network node comprising processing circuitry operable to:
obtain a first paging occasion configuration and a first synchronization signal configuration;
determine that a paging occasion specified by the first paging occasion configuration at least partially overlaps in time with a synchronization signal specified by the first synchronization signal configuration;
modify at least one of
the paging occasion configuration for the at least partially overlapping paging occasion, and
the synchronization signal configuration for the at least partially overlapping synchronization signal
to frequency multiplex the paging occasion and the synchronization signal, wherein modifying the at least one the paging occasion configuration and the synchronization signal configuration comprises modifying a page search space configuration associated with the paging occasion by replacing a Physical Downlink Control Channel (PDCCH) monitoring configuration associated with the paging occasion with a pattern of the frequency-multiplexed paging occasion and the synchronization signal; and
transmit the paging occasion and the synchronization signal in the carrier frequency band according to the at least one of the modified paging occasion configuration and modified synchronization signal configuration.

14. The network node of claim 13, the processing circuitry further operable to obtain configuration information indicating that the network node should determine whether a paging occasion at least partially overlaps in time with a synchronization signal.

15. The network node of claim 14, wherein the obtained configuration information further indicates a frequency multiplexing pattern to use when the network node determines that a paging occasion at least partially overlaps in time with a synchronization signal.

16. The network node of claim 13, wherein the processing circuitry is operable to modify at least one of the paging occasion configuration and the synchronization signal configuration by modifying at least one of the paging occasion configuration and the synchronization signal configuration according to Third Generation Partnership Project (3GPP) fifth generation (5G) new radio (NR) CORESET-SSB multiplexing patterns 2 or 3.

17. The network node of claim 13, wherein the processing circuitry is operable to determine that the paging occasion at least partially overlaps in time with the synchronization signal by determining that the paging occasion at least partially overlaps in time with the synchronization signal if a network node uses all synchronization signal beams specified by the Third Generation Partnership Project (3GPP) fifth generation (5G) new radio (NR) standard specification for the carrier frequency band.

18. The network node of claim 13, wherein the processing circuitry is operable to determine that the paging occasion at least partially overlaps in time with the synchronization signal by determining that the paging occasion at least partially overlaps in time with the synchronization signal plus a guard time.

19. The network node of claim 13, wherein the processing circuitry is operable to determine that the paging occasion at least partially overlaps in time with the synchronization signal by determining that the paging occasion occurs in the same slot as the synchronization signal.

20. The network node of claim 13, wherein the processing circuitry is operable to determine that the paging occasion at least partially overlaps in time with the synchronization signal by determining that at least part of the paging occasion is located in the same radio frame as the synchronization signal.

21. The network node of claim 13, wherein the processing circuitry is operable to determine that the paging occasion at least partially overlaps in time with the synchronization signal by determining that at least part of the paging occasion is located the same radio half frame as the synchronization signal.

22. The network node of claim 13, wherein the paging occasion comprises a plurality of monitoring occasions and the processing circuitry is operable to determine that the paging occasion at least partially overlaps in time with the synchronization signal by determining that at least one monitoring occasion of the plurality of monitoring occasions at least partly overlaps in time with the synchronization signal.

* * * * *